United States Patent
Thompson, II et al.

(10) Patent No.: US 10,673,469 B2
(45) Date of Patent: Jun. 2, 2020

(54) MULTI-BAND MULTI-MODE SOFTWARE DEFINED RADIO

(71) Applicant: Morgan State University, Baltimore, MD (US)

(72) Inventors: Willie L Thompson, II, Baltimore, MD (US); Samuel Berhanu, Baltimore, MD (US); Jan-Paul Alleyne, Gainesville, FL (US)

(73) Assignee: Morgan State University, Baltimore, MD (US)

( * ) Notice: Subject to any disclaimer, the term of this patent is extended or adjusted under 35 U.S.C. 154(b) by 0 days.

(21) Appl. No.: 16/239,432

(22) Filed: Jan. 3, 2019

(65) Prior Publication Data

US 2019/0207631 A1  Jul. 4, 2019

Related U.S. Application Data

(60) Provisional application No. 62/613,169, filed on Jan. 3, 2018.

(51) Int. Cl.
| | |
|---|---|
| *H04B 1/00* | (2006.01) |
| *H04B 1/04* | (2006.01) |
| *H04B 1/50* | (2006.01) |
| *H04W 88/06* | (2009.01) |

(52) U.S. Cl.
CPC .......... *H04B 1/0028* (2013.01); *H04B 1/006* (2013.01); *H04B 1/0483* (2013.01); *H04B 1/50* (2013.01); *H04W 88/06* (2013.01)

(58) Field of Classification Search
CPC .... H04B 1/0028; H04B 1/006; H04B 1/0483; H04B 1/50; H04W 88/06
See application file for complete search history.

(56) References Cited

U.S. PATENT DOCUMENTS

| | | | |
|---|---|---|---|
| 2014/0051363 A1* | 2/2014 | Kennedy | H04W 24/00 455/67.11 |
| 2016/0086484 A1* | 3/2016 | Feher | H04H 20/59 375/130 |

* cited by examiner

*Primary Examiner* — Vineeta S Panwalkar
(74) *Attorney, Agent, or Firm* — Whiteford, Taylor & Preston, LL; Peter J. Davis

(57) ABSTRACT

A multi-band, multi-mode software defined radio (MBMM SDR) platform having a multi-band front end (MBFE), a multi-mode digital radio (MMDR), a configuration & control (C2) subsystem, and a power distribution subsystem. The MBFE provides wideband operations, L/S/C-Band telemetry band selection, and channel tuning. The MMDR provides high-speed signal processing and flexible programming to support multiple telemetry waveforms that are implemented using system-on-chip technology. An integrated pulse code modulation/frequency modulation (PCM/FM) and shaped offset quadrature shift keying (SOQPSK-TG) transmitter and a non-coherent PCM/FM receiver has been developed. The C2 subsystem allows for pre-test configuration and control of the MBFE and MMDR subsystems.

7 Claims, 41 Drawing Sheets

MBMM SDR Block Diagram

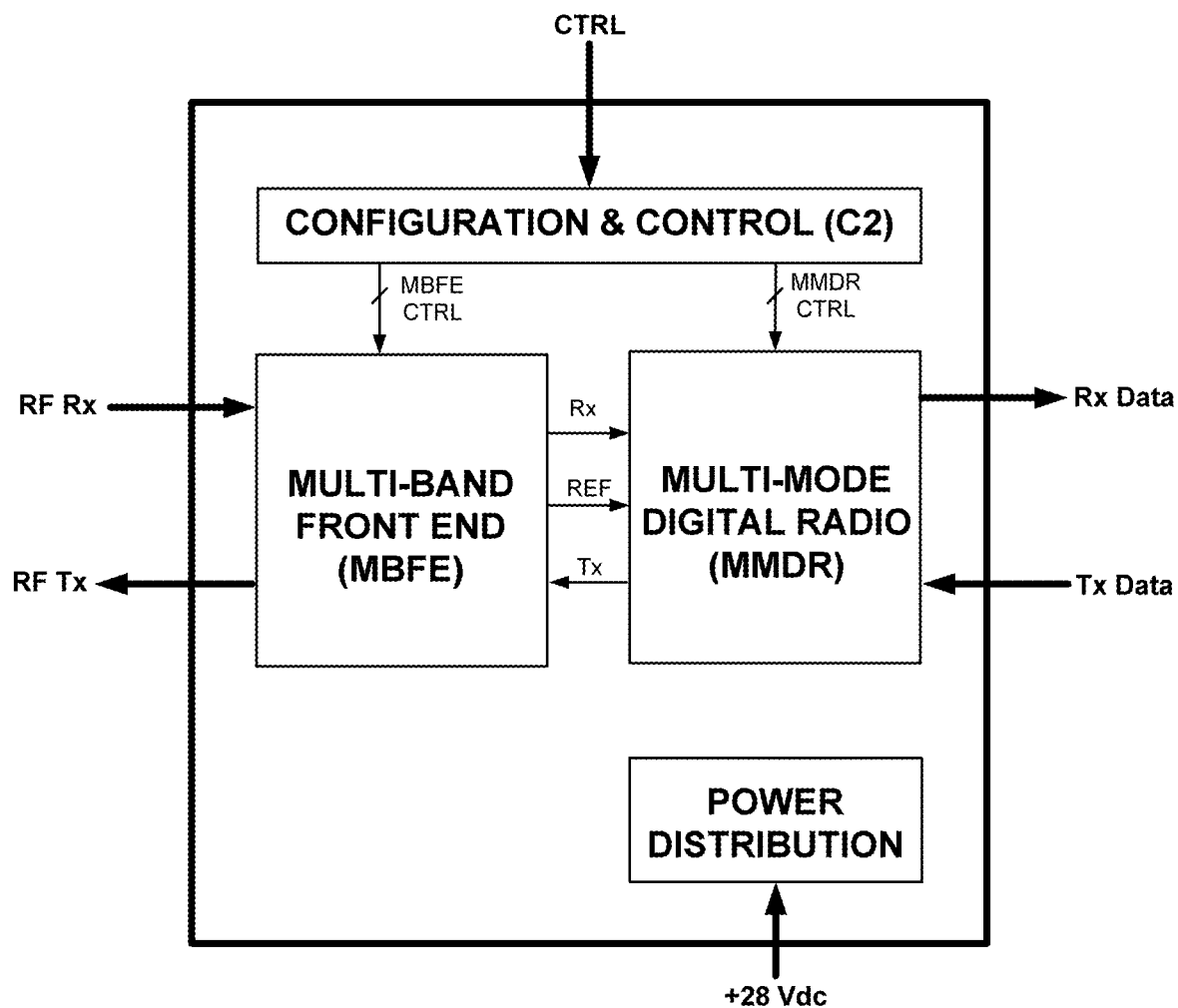
Figure 1: MBMM SDR Block Diagram

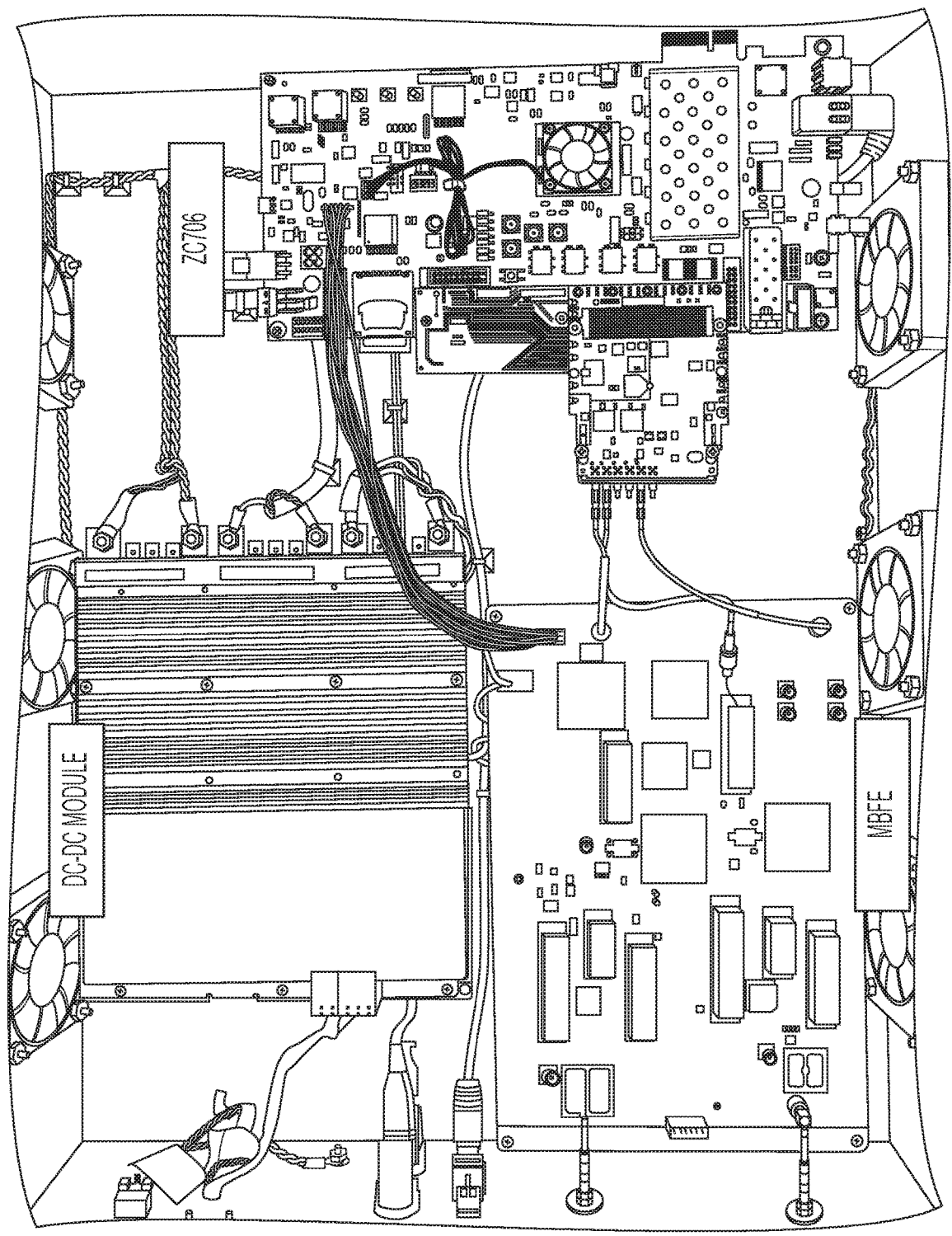
Figure 2: MBMM SDR Platform

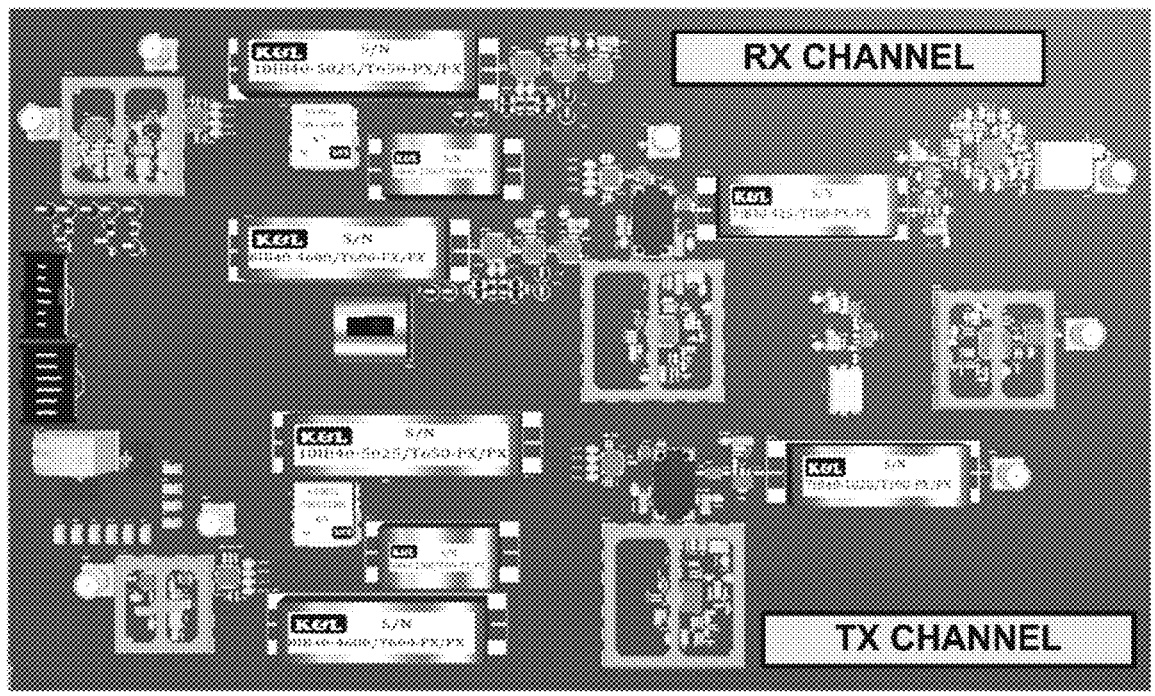
Figure 3: MBFE Board Layout - RF Side
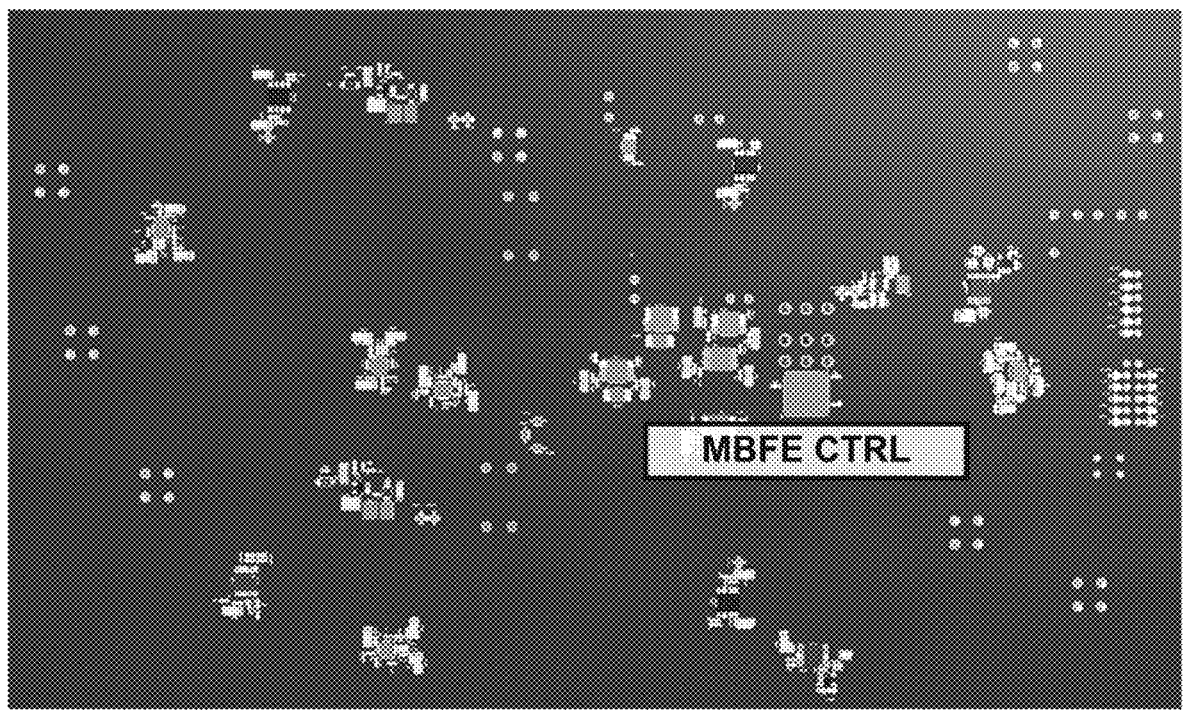
Figure 4: MBFE Board Layout - Digital Side

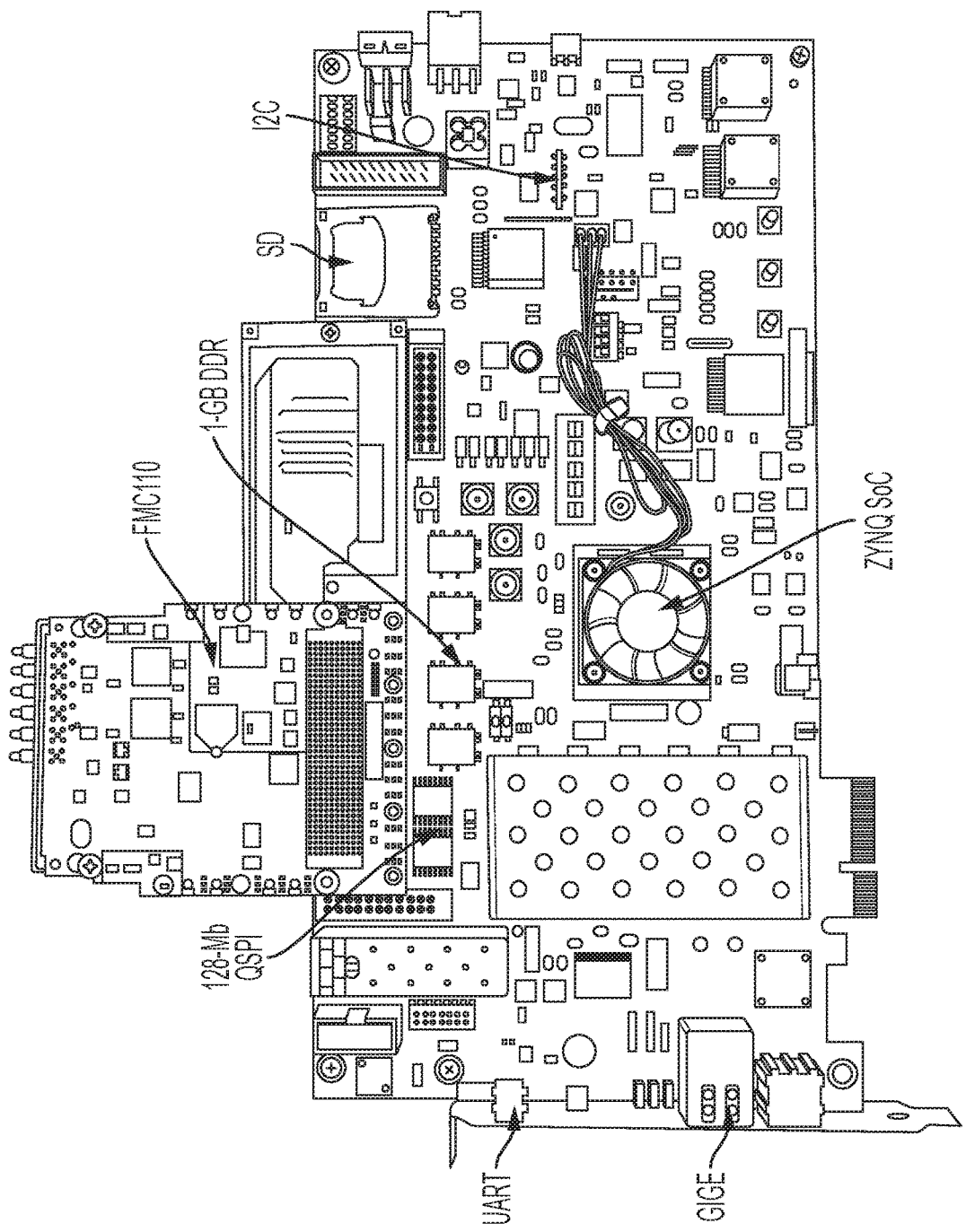
Figure 5: ZC706 Evaluation Board

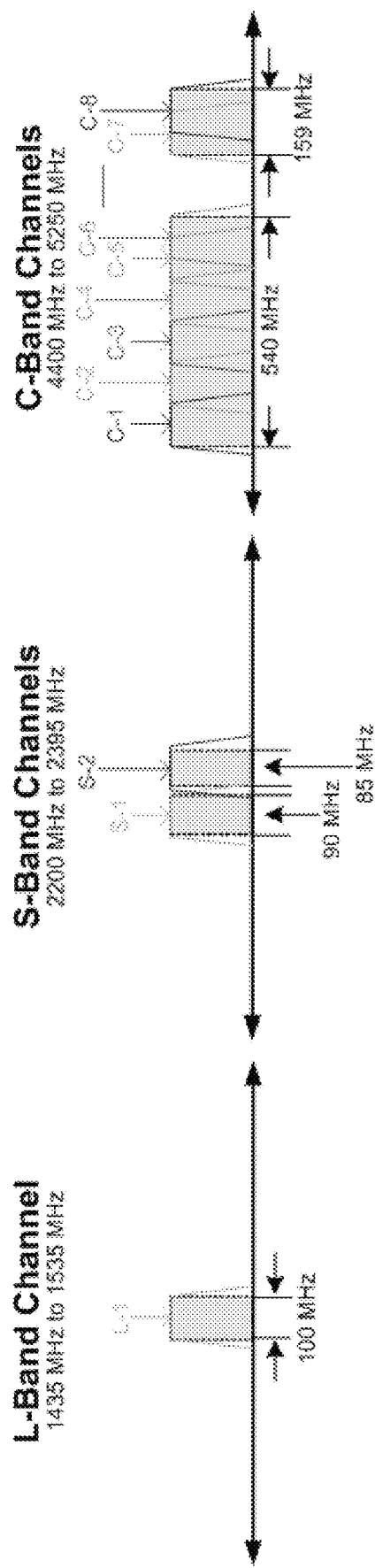
Figure 6: Telemetry Band Configuration Modes

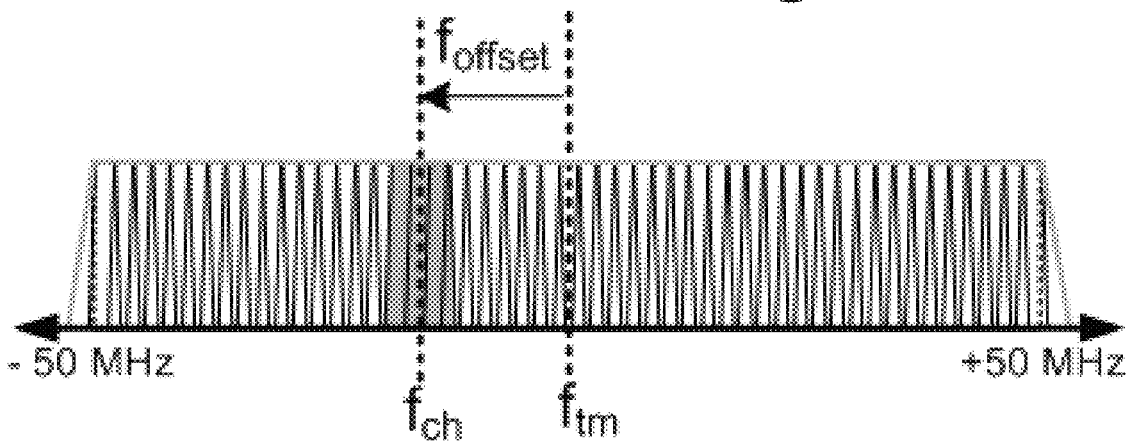
Figure 7: Transmitter Channel Tuning

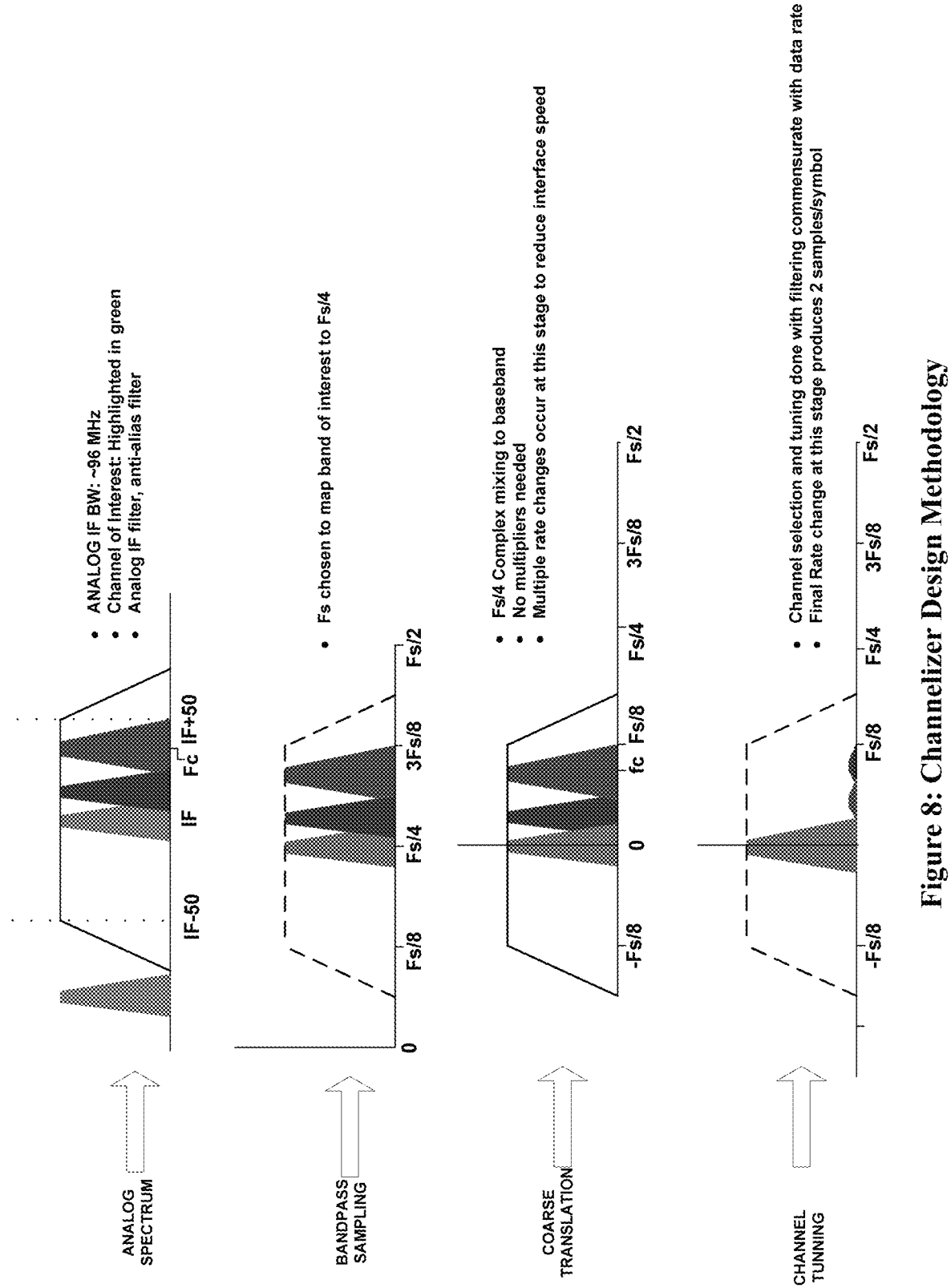
Figure 8: Channelizer Design Methodology

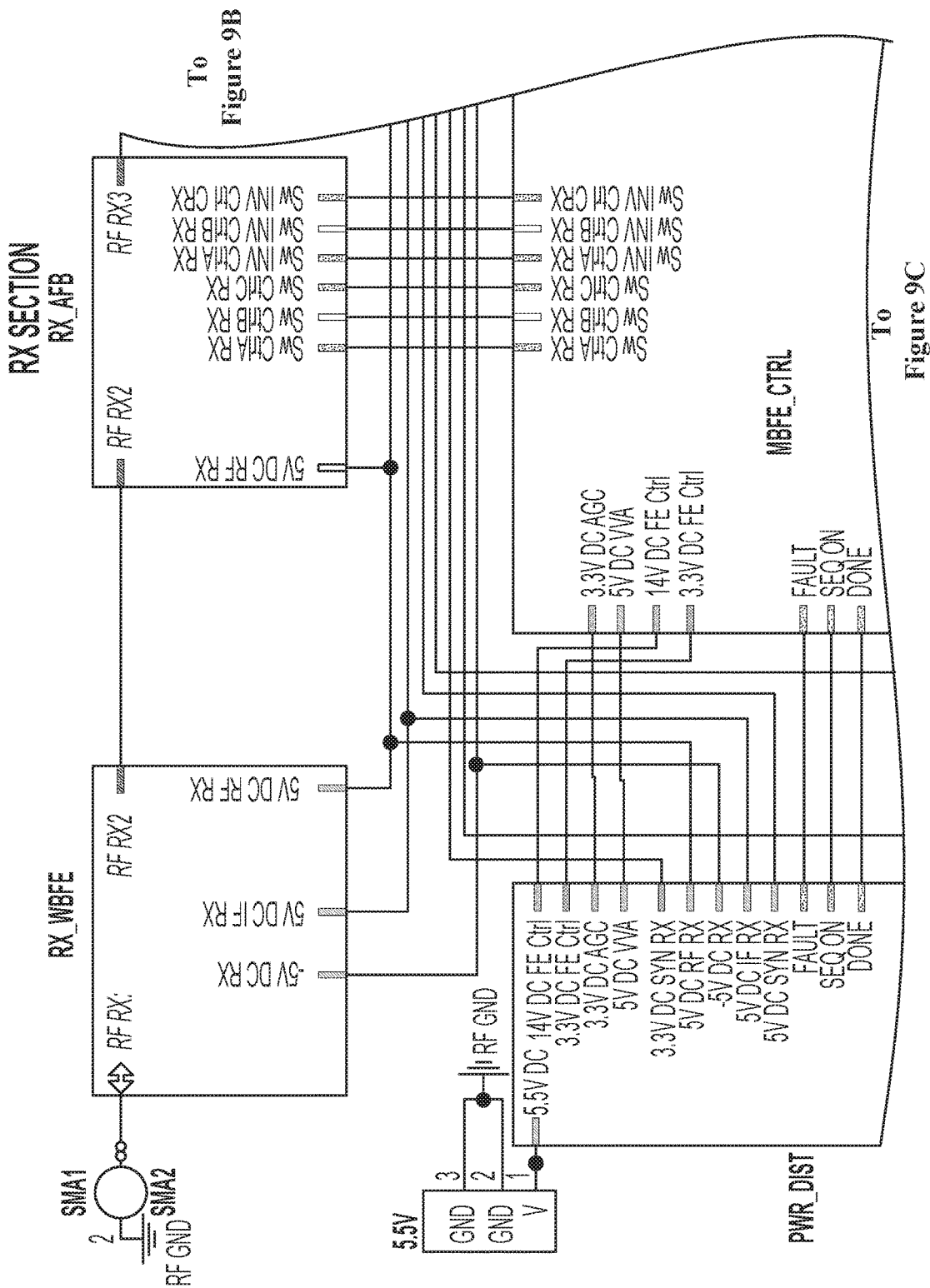
Figure 9A: Multi-Band Front-End Block Diagram

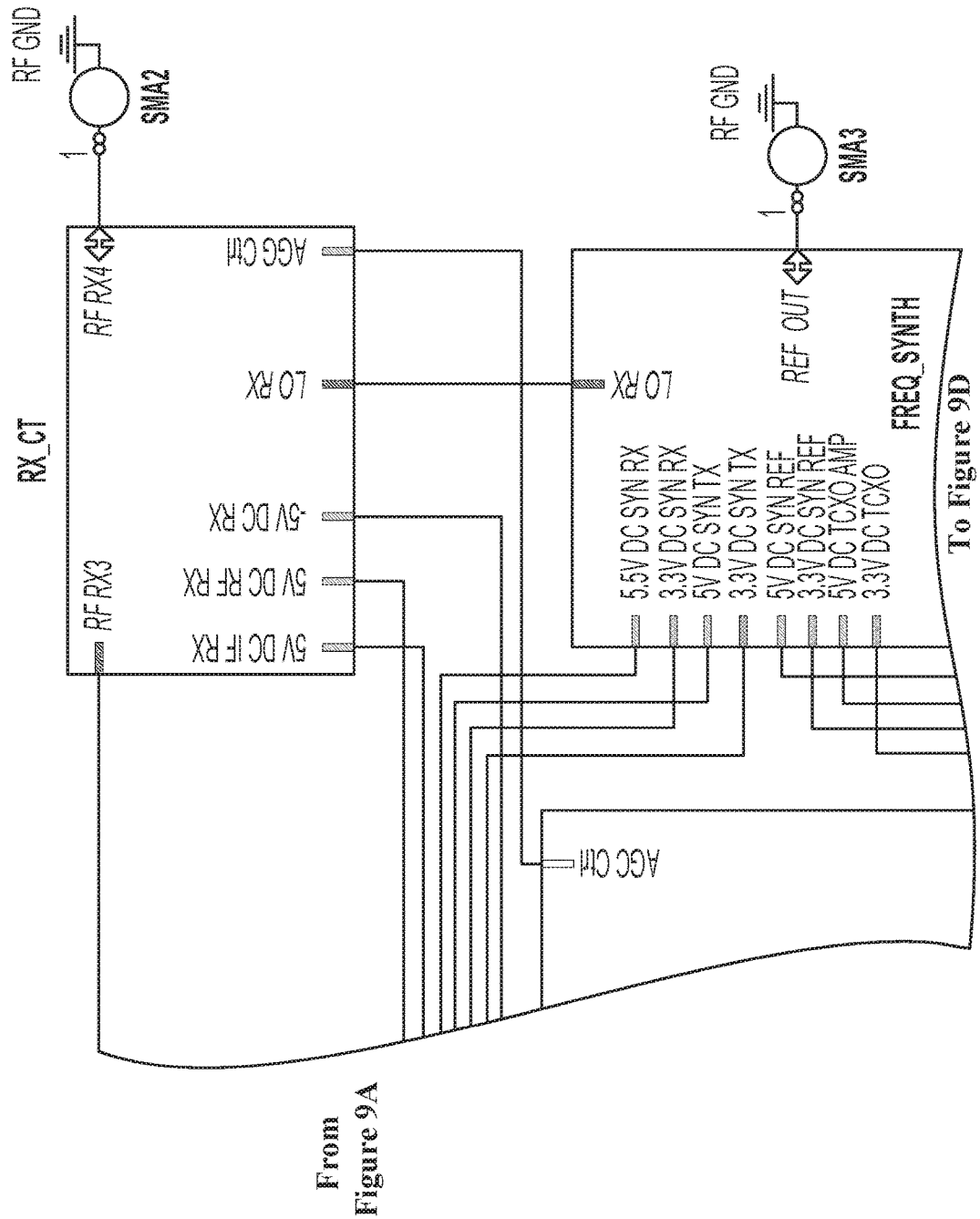
Figure 9B: Multi-Band Front-End Block Diagram Continued

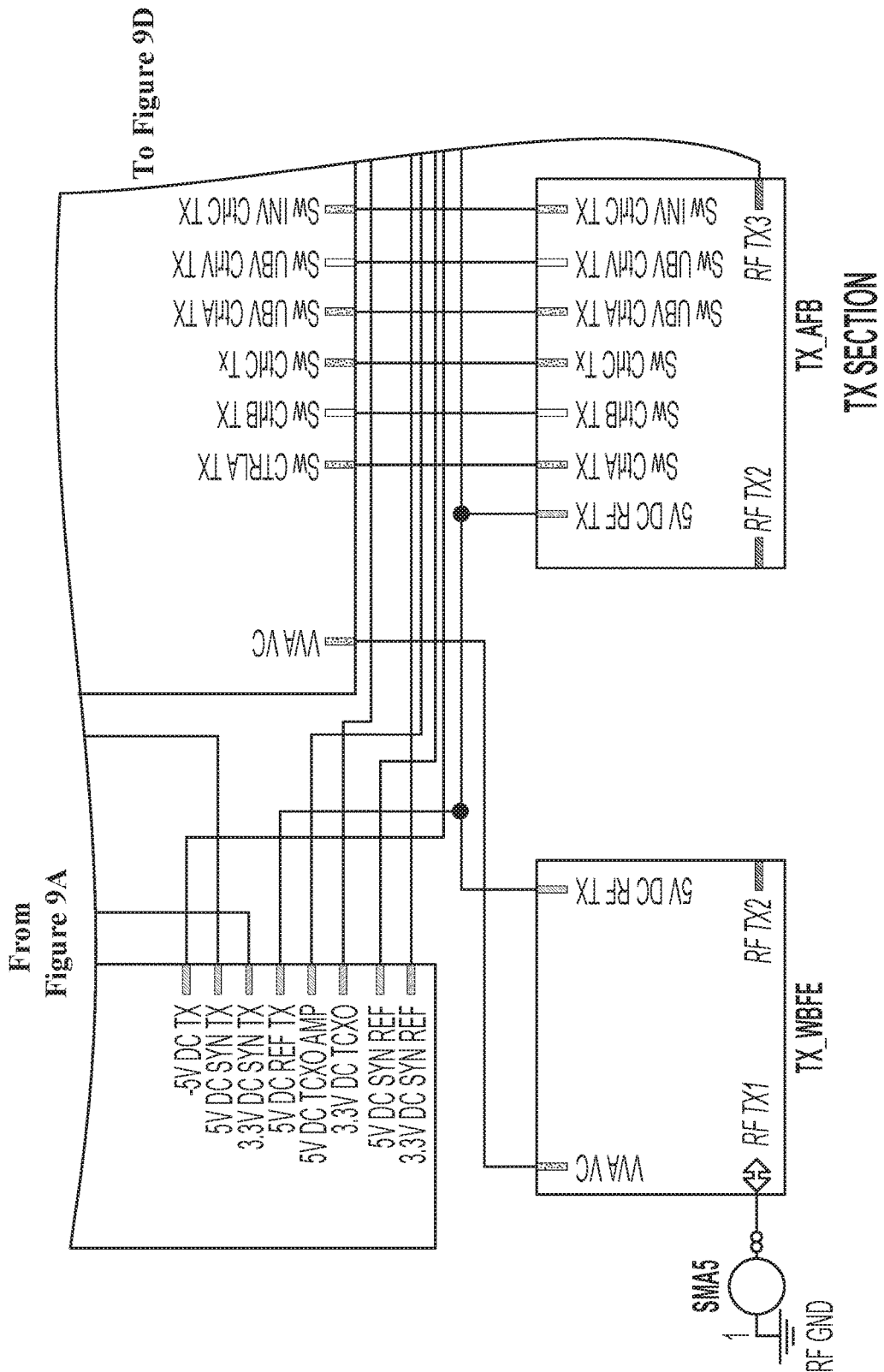
Figure 9C: Multi-Band Front-End Block Diagram Continued

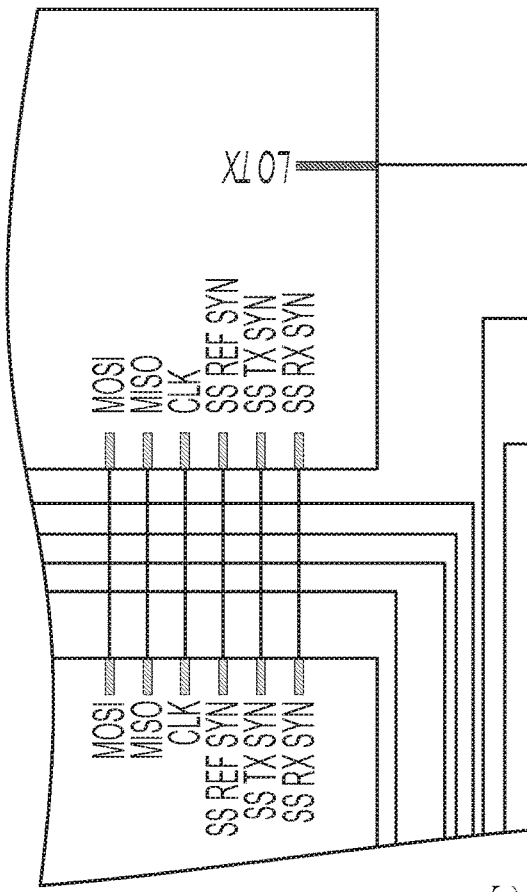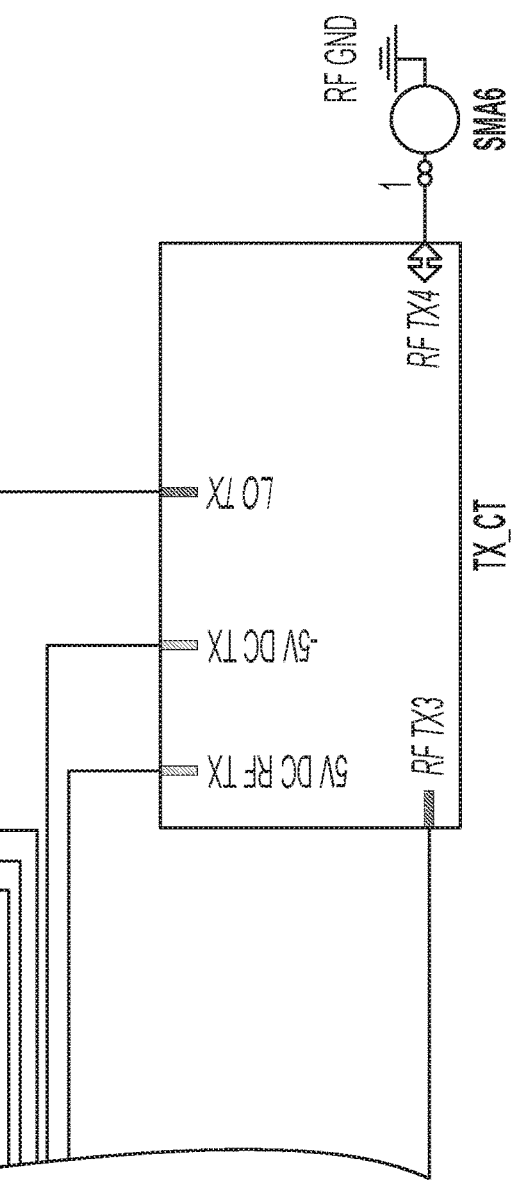
Figure 9D: Multi-Band Front-End Block Diagram Continued

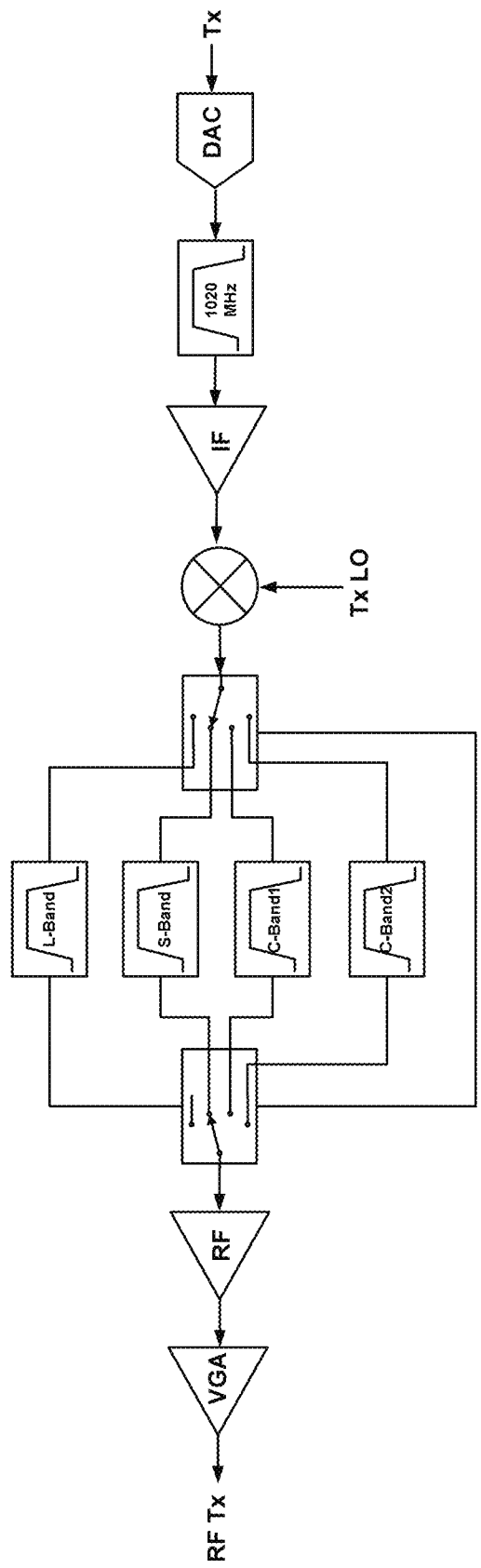
Figure 10: MBFE Transmitter Block Diagram

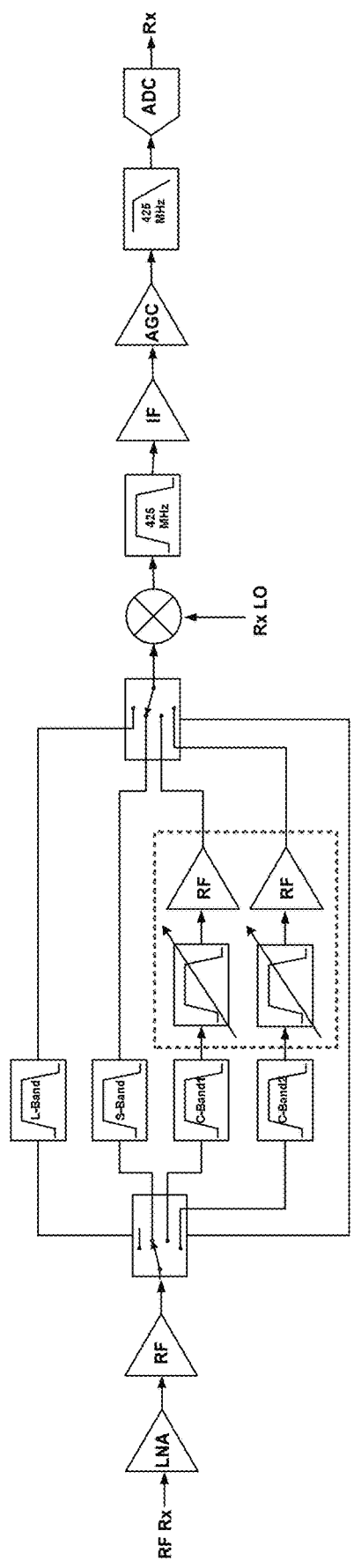
Figure 11: MBFE Receiver Block Diagram

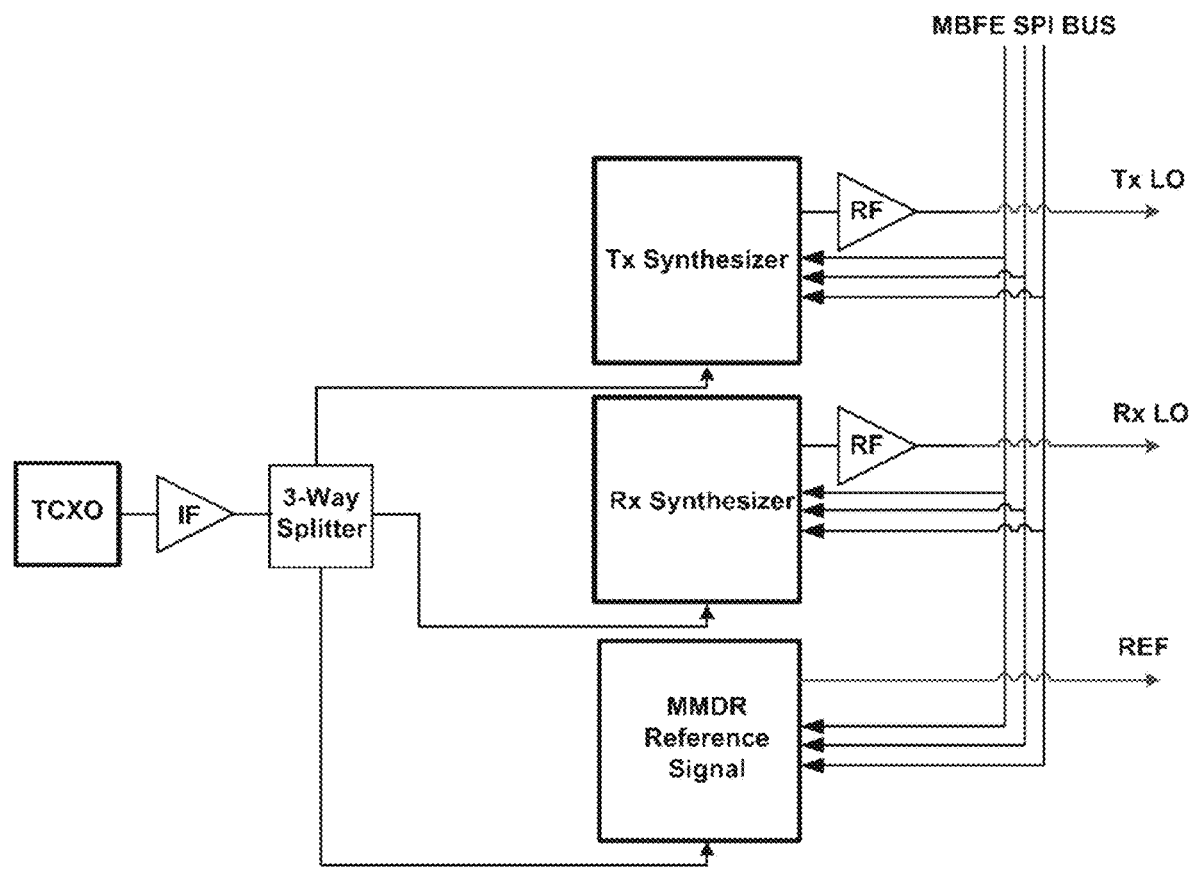
Figure 12: Frequency Synthesizer Block Diagram

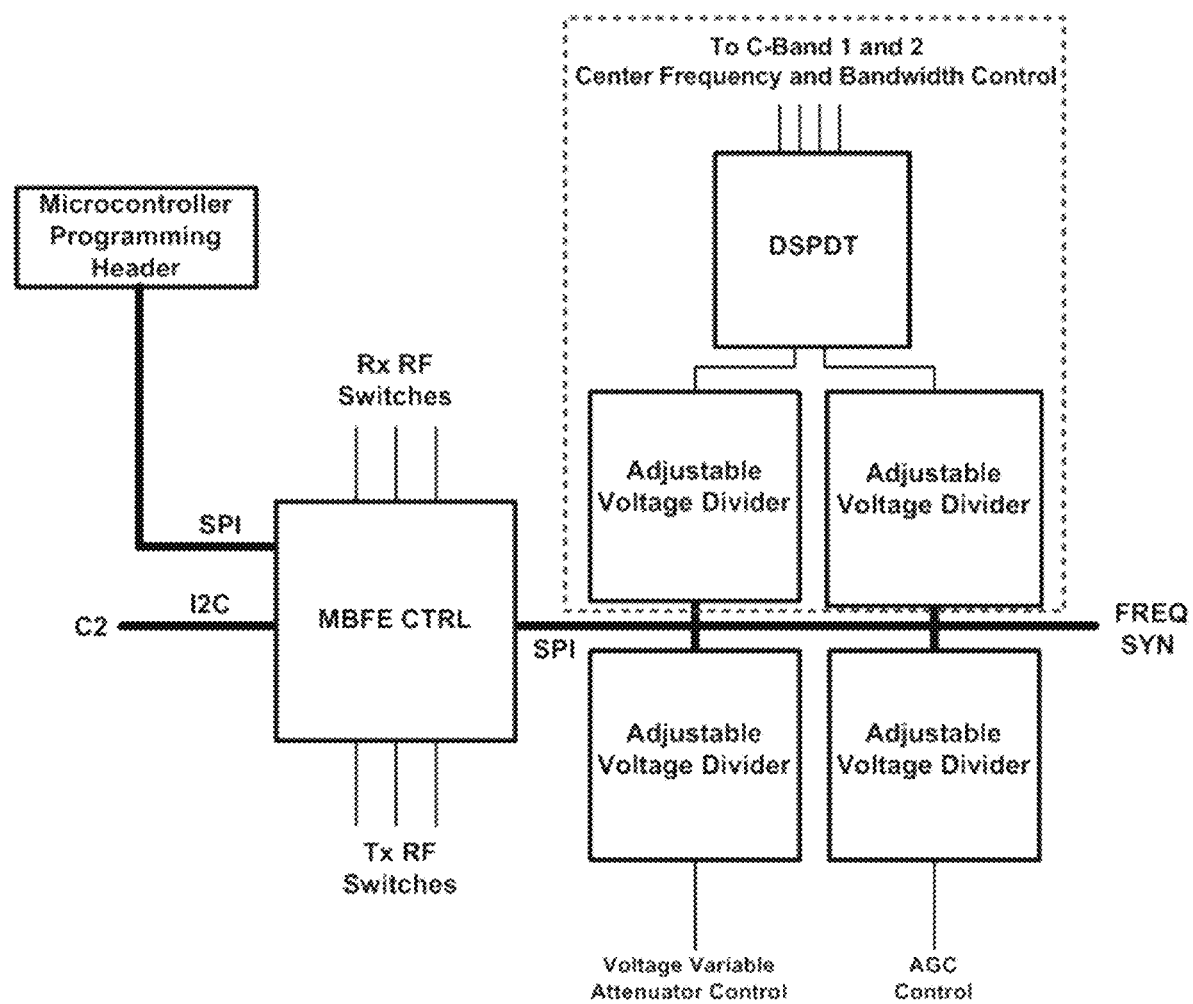
Figure 13: MBFE Controller Block Diagram

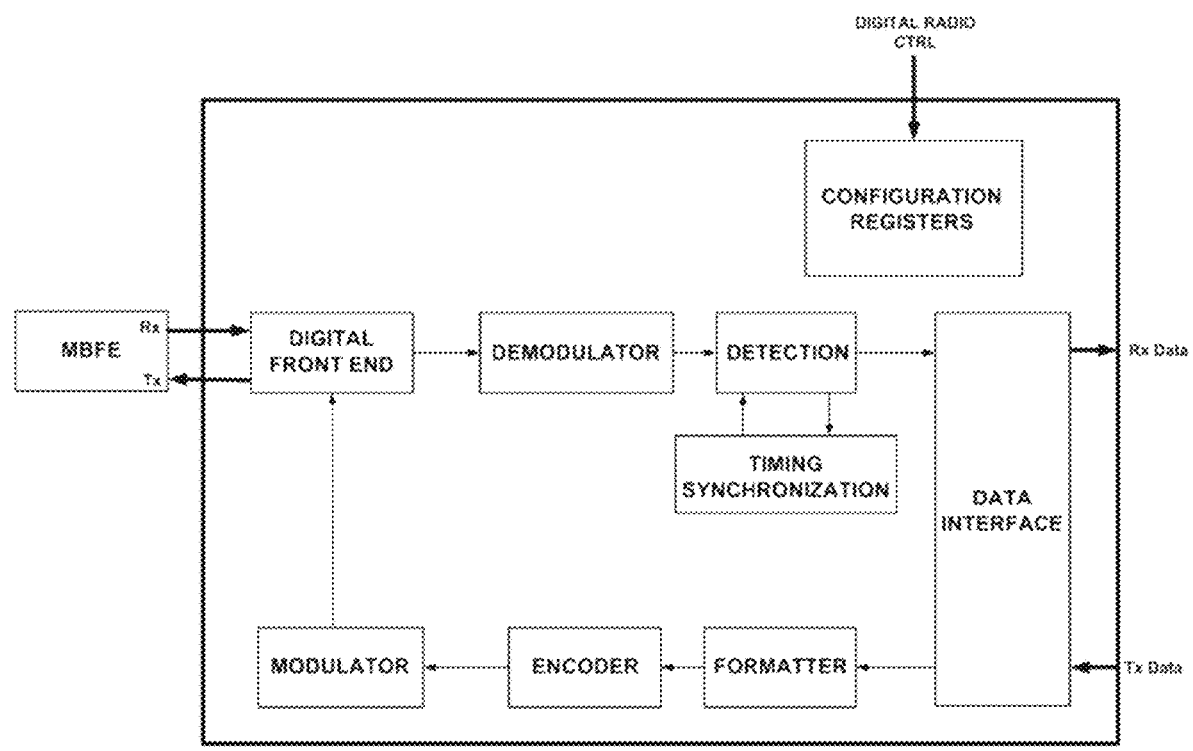
Figure 14: MMDR Block Diagram

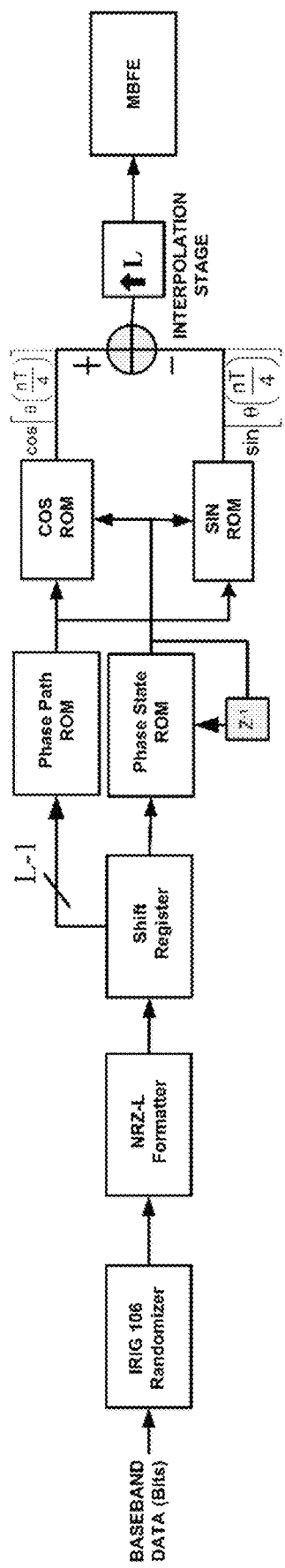
Figure 15: Tx Chain Common Hardware Architecture

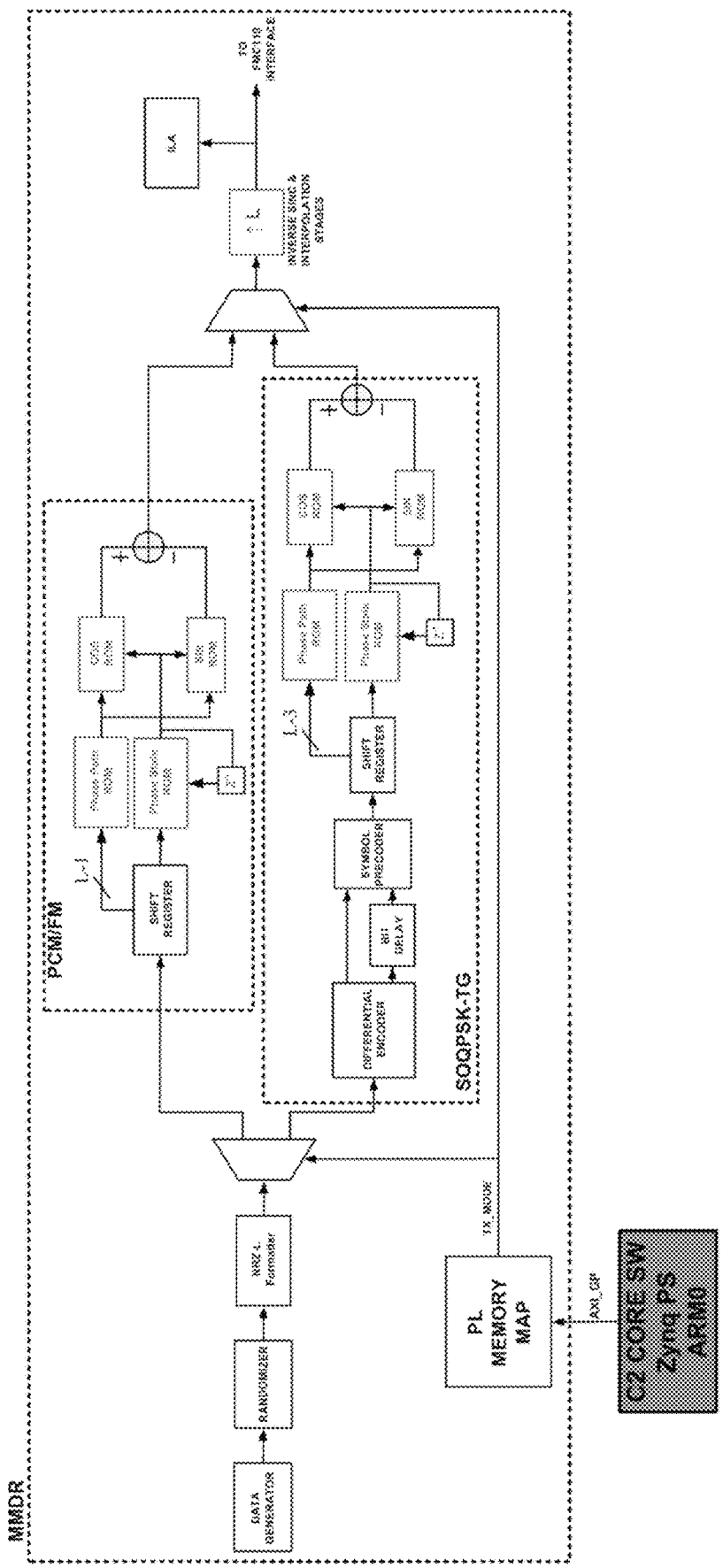
Figure 16: MMDR Tx Firmware Design

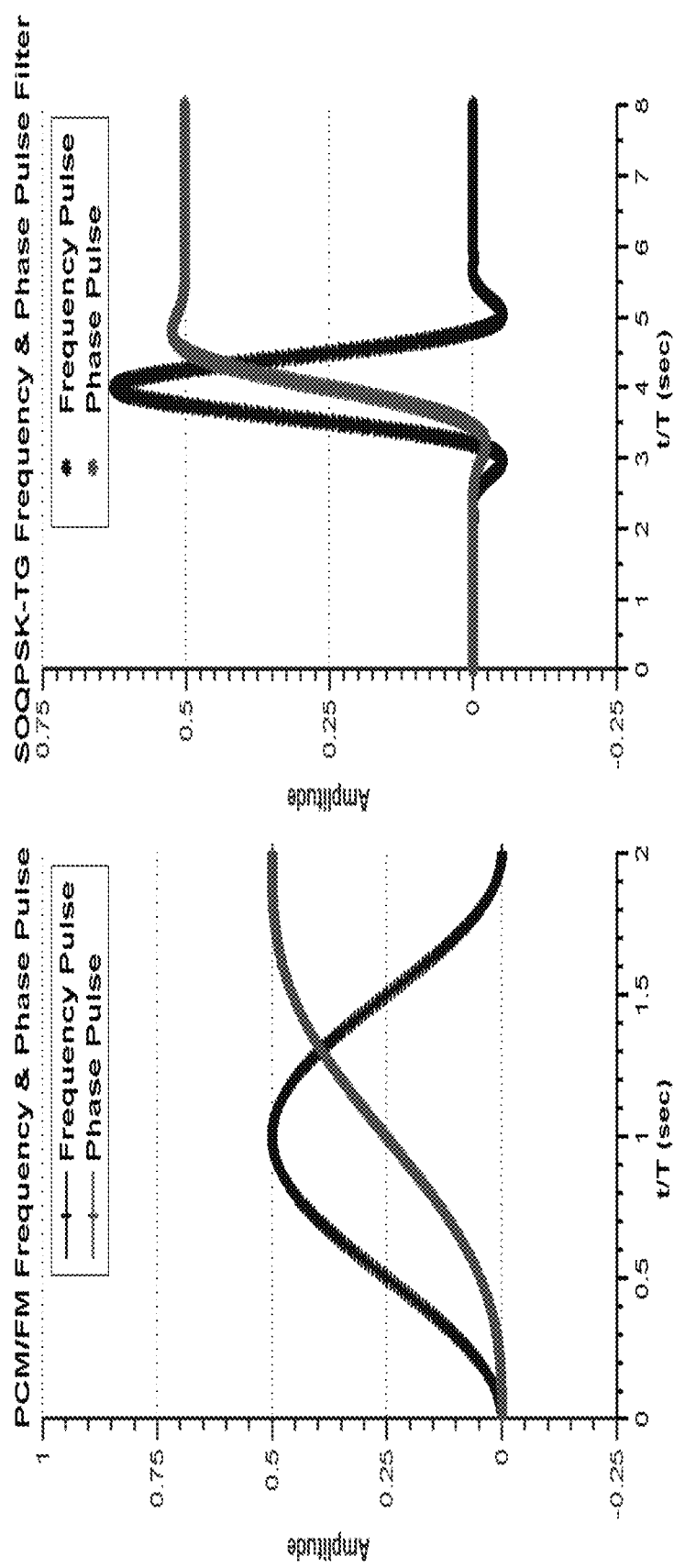
Figure 17: PCM/FM & SOQPSK-TG Frequency & Phase Pulse

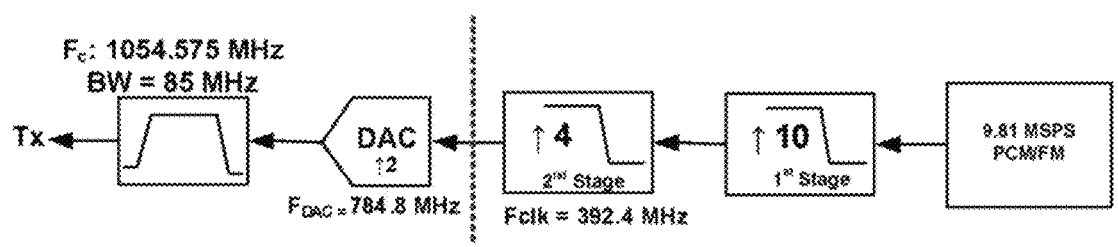
Figure 18: Tx Digital Front-End Block Diagram
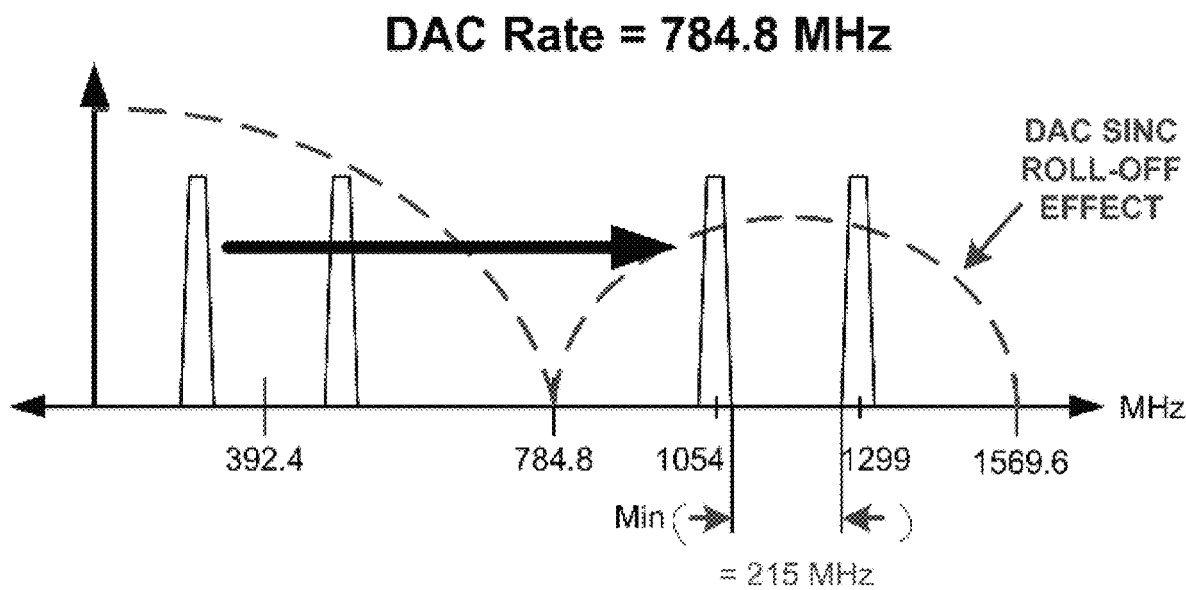
Figure 19: DAC Output Spectrum

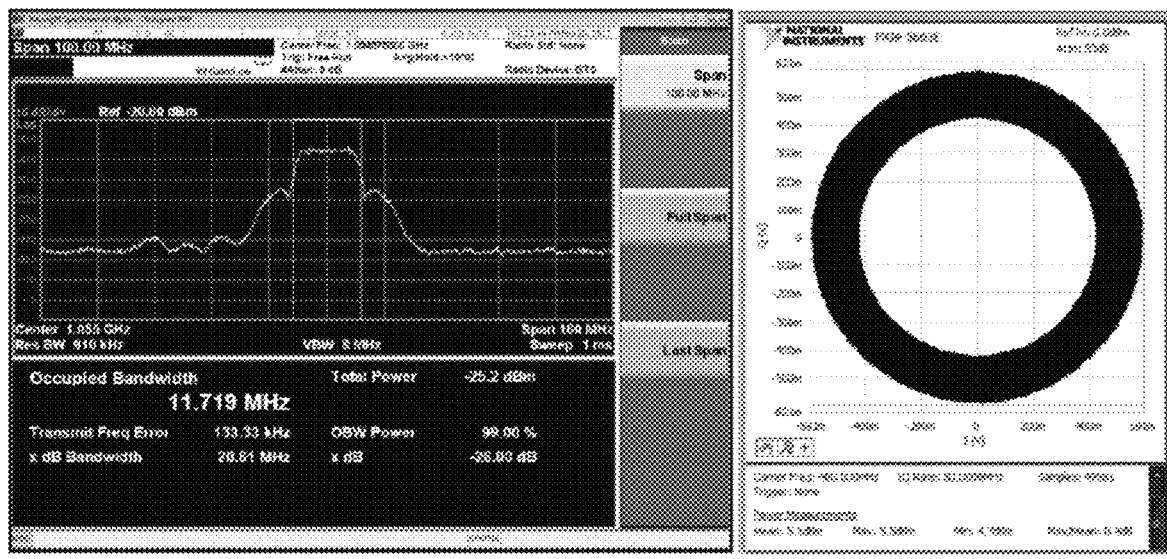
Figure 20: Tx Spectrum Left & Right: 2352 MHz with OCW Measurement & Scatter Plot

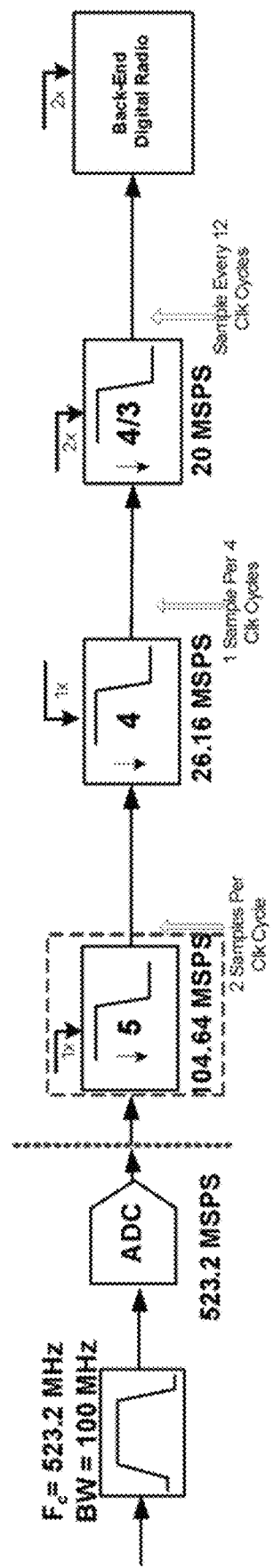
Figure 21: Rx Data Rate Architecture

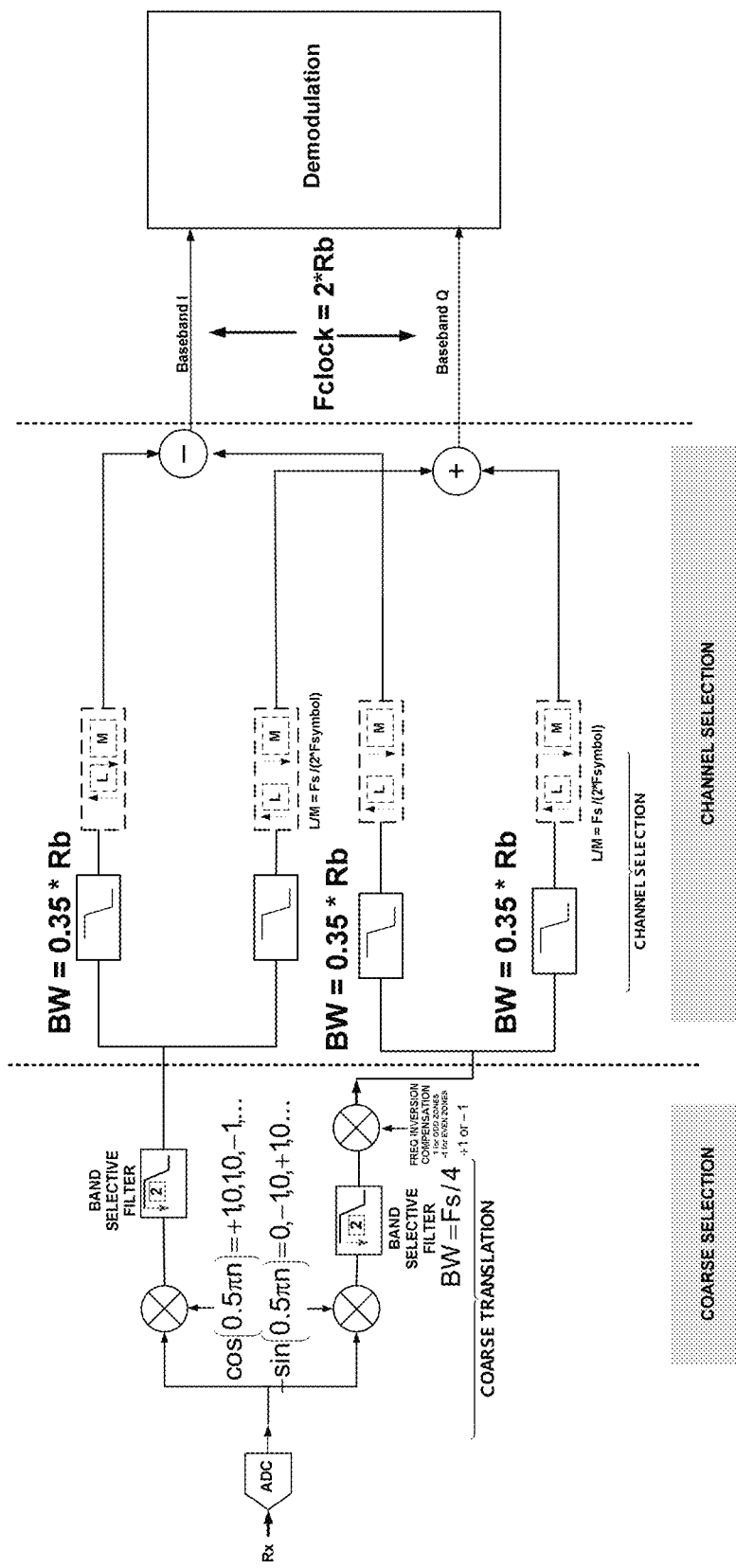
Figure 22: Rx Channelization Architecture

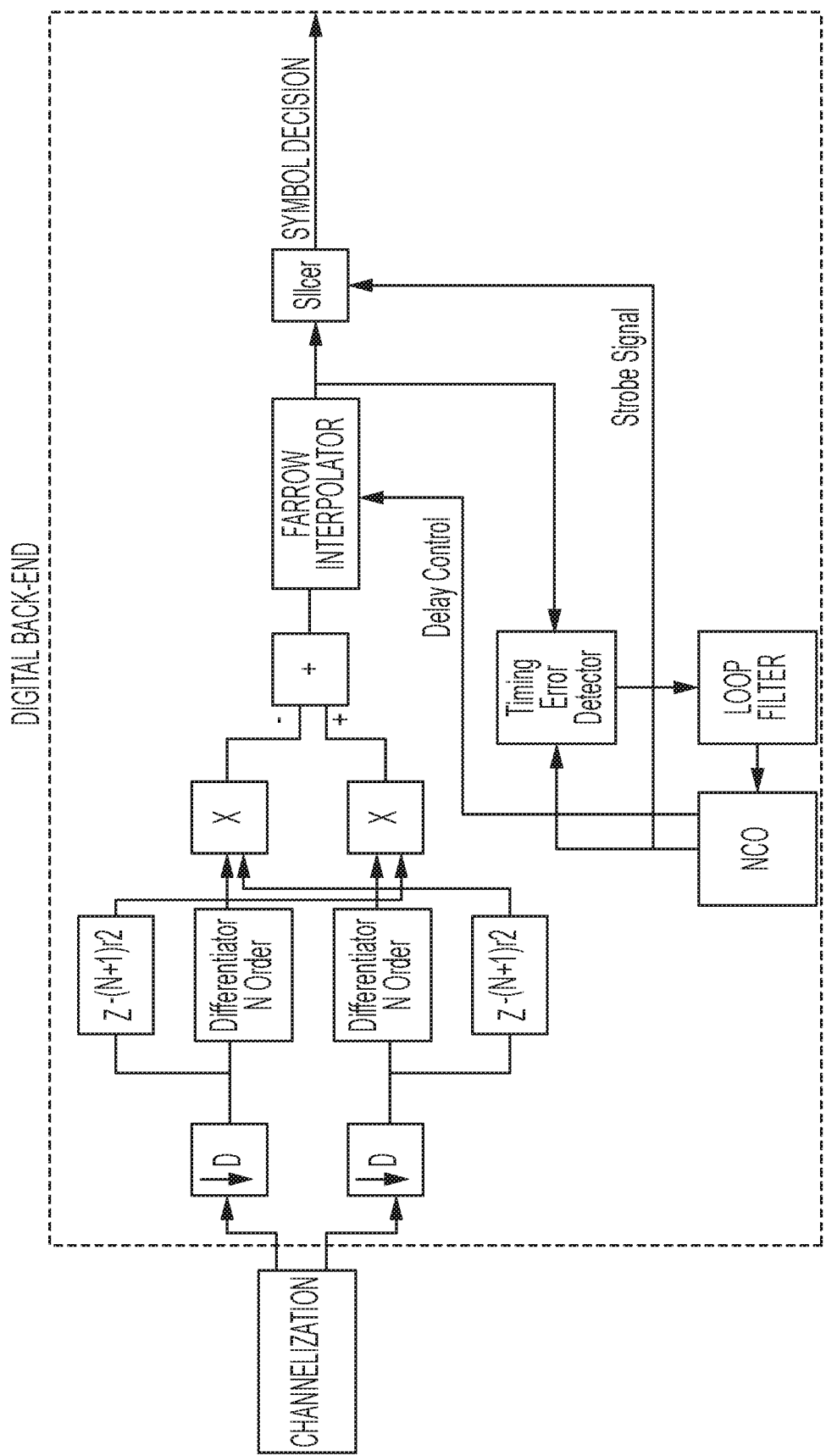
Figure 23A: RX Digital Back-end Architecture

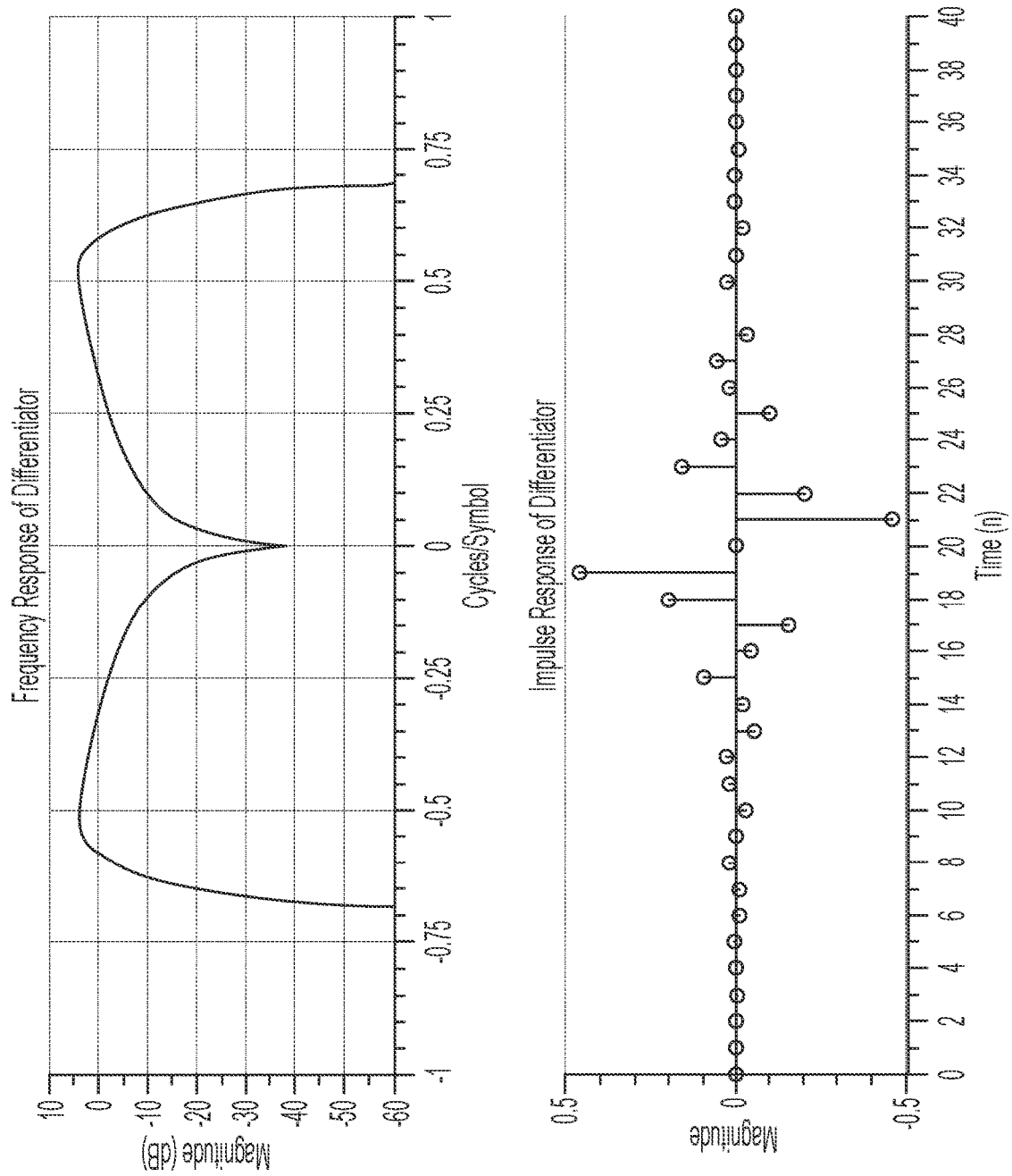
Figure 23B: Frequency And Impulse Responses of Differentiator Filter

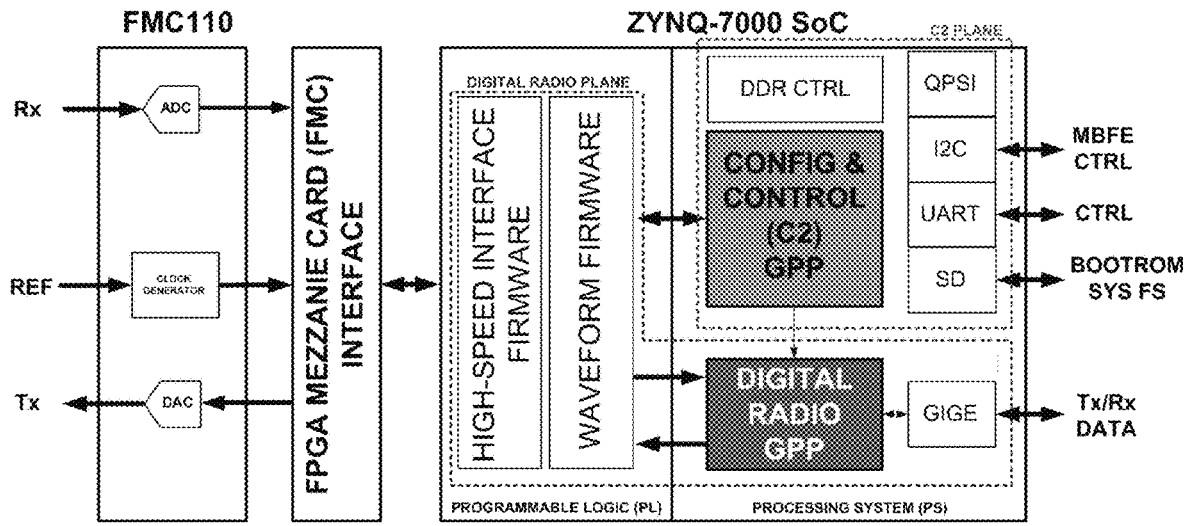
Figure 24: System Framework Block Diagram
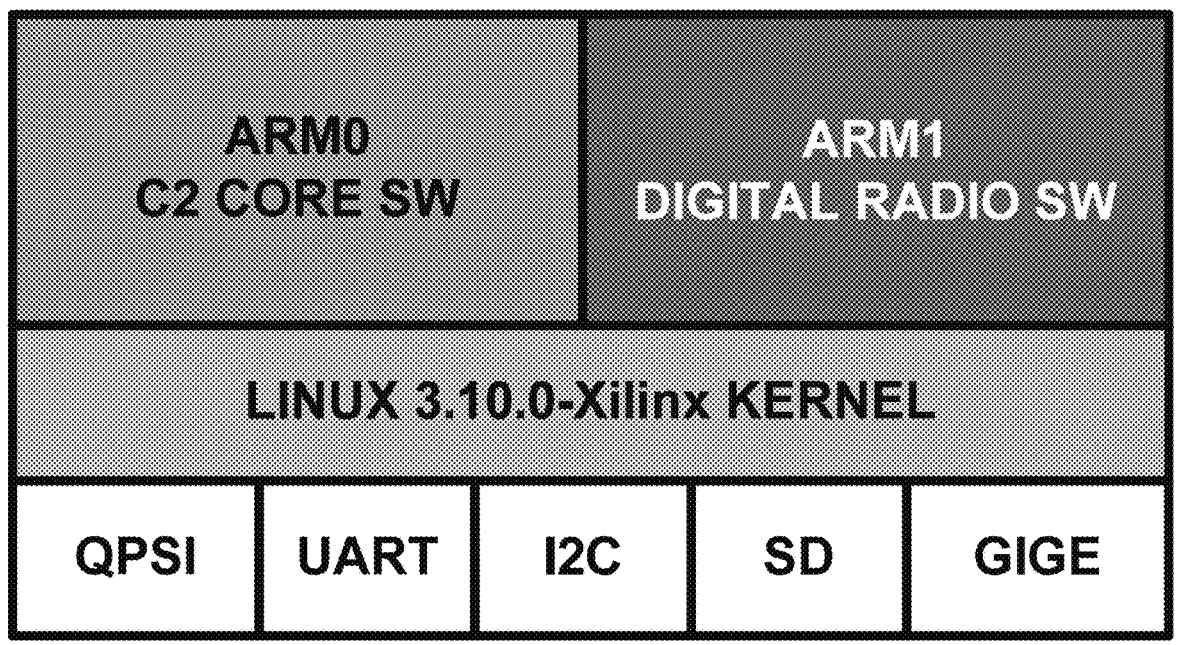
Figure 25: Software Stack

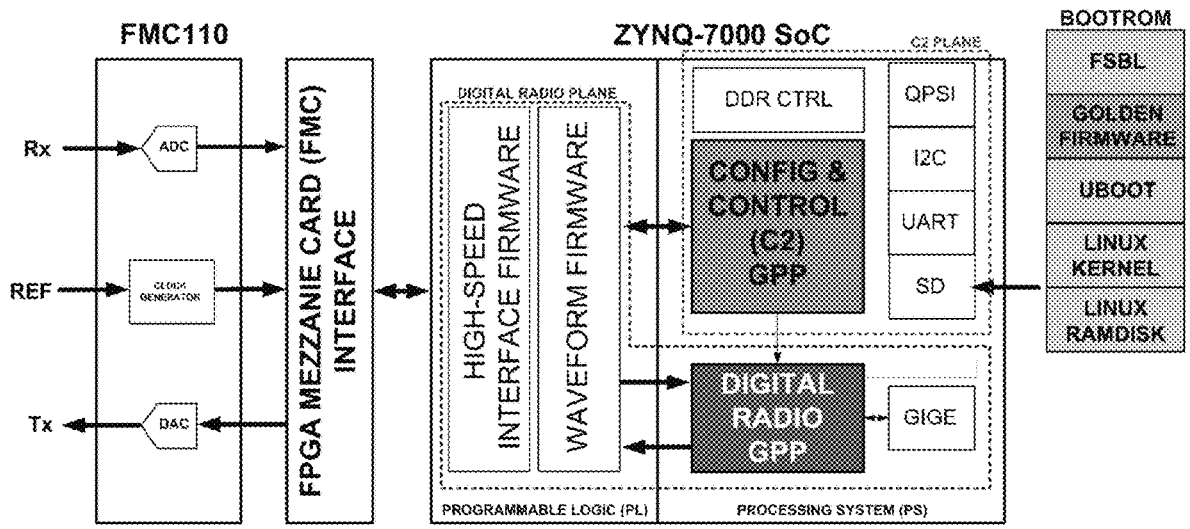
Figure 26: Boot Sequence Framework
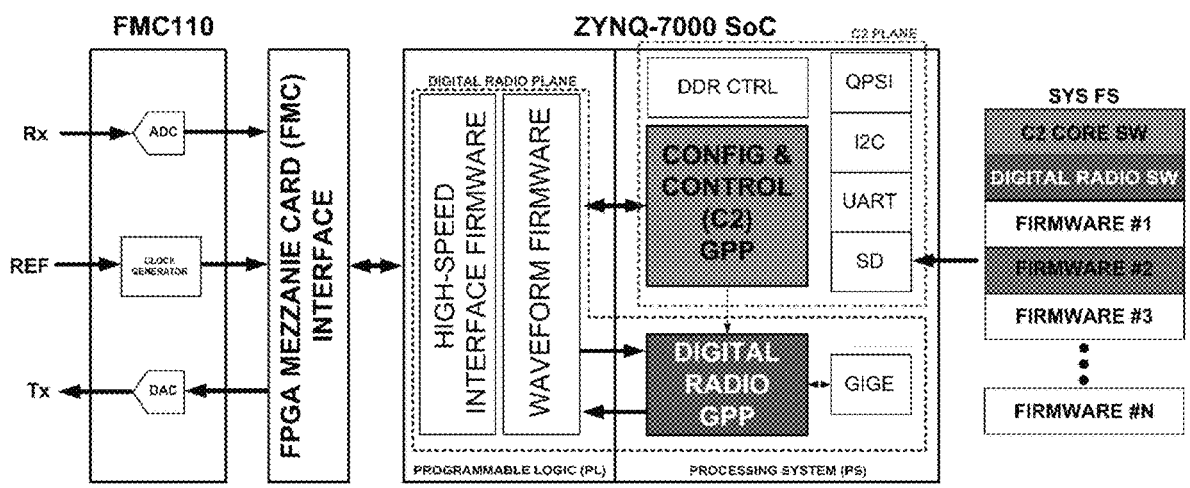
Figure 27: Configuration Framework Diagram

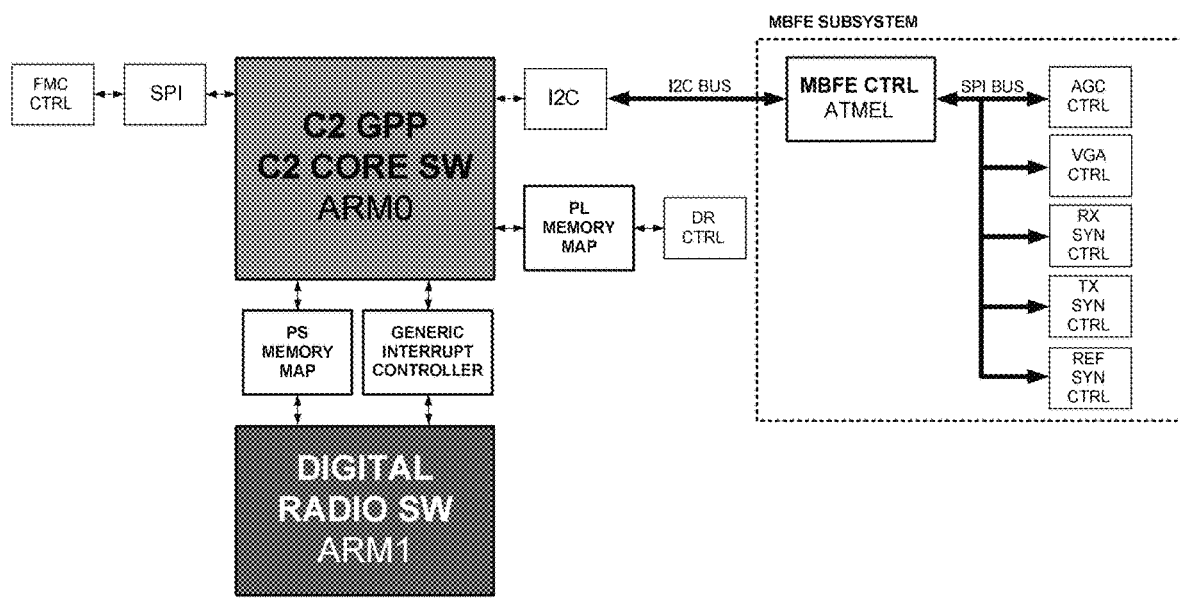
Figure 28: Control and Status Framework Diagram

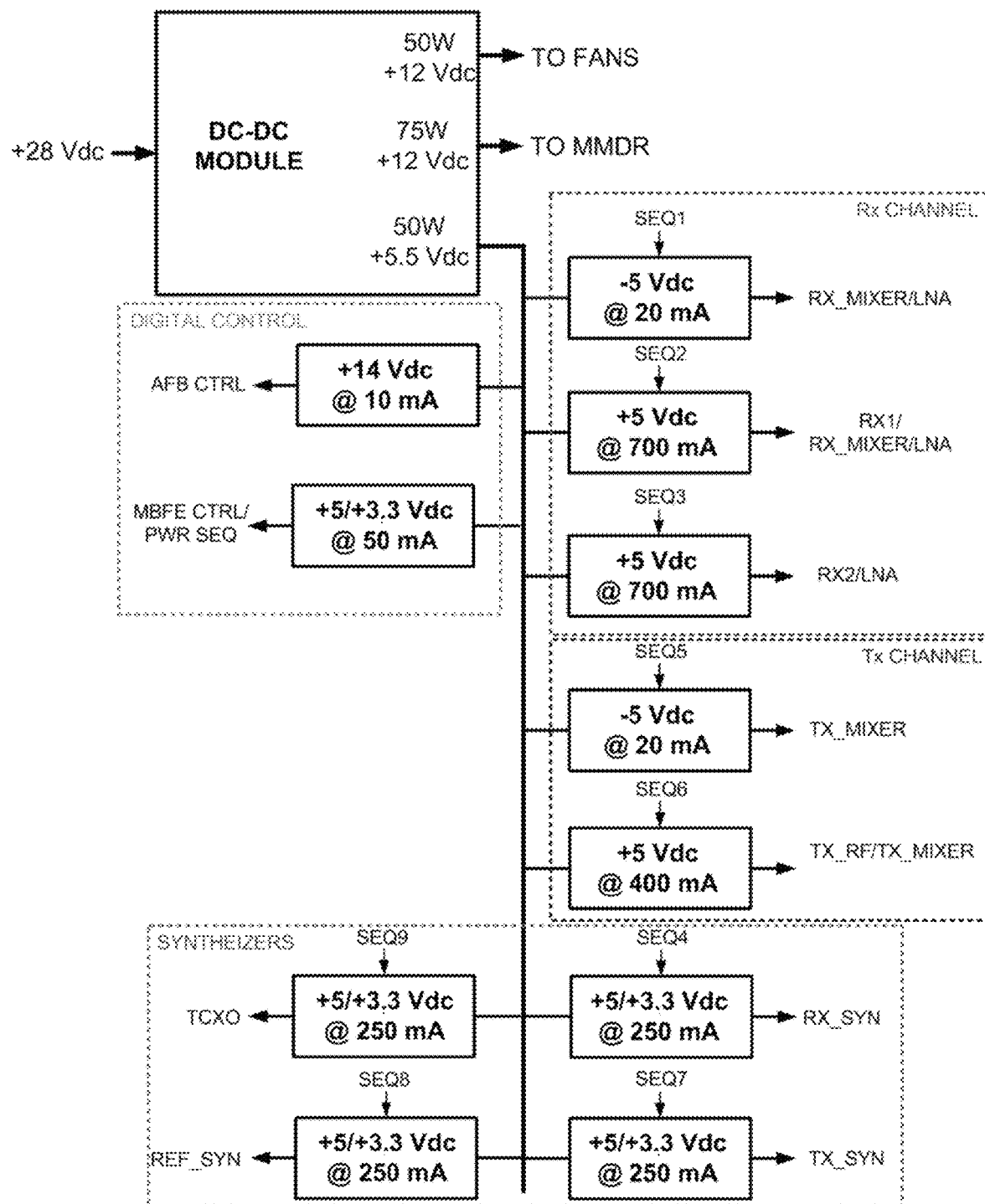
Figure 29: Power Distribution Block Diagram

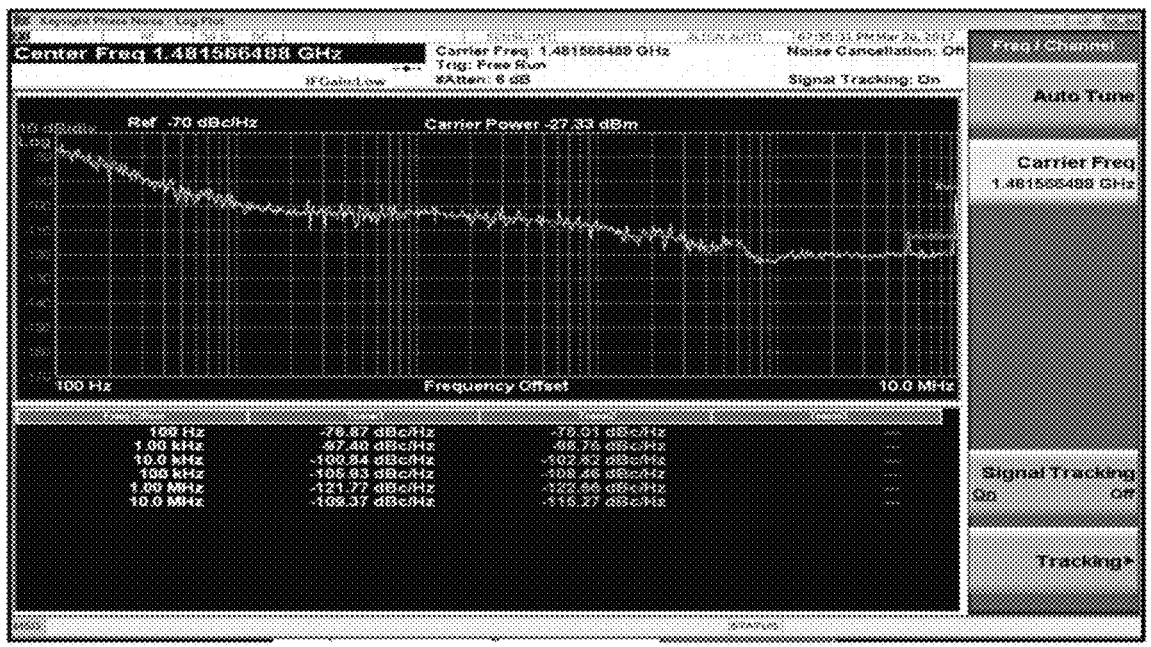
Figure 30: Tx Single Sideband Phase Noise at L-Band (1485 MHz)
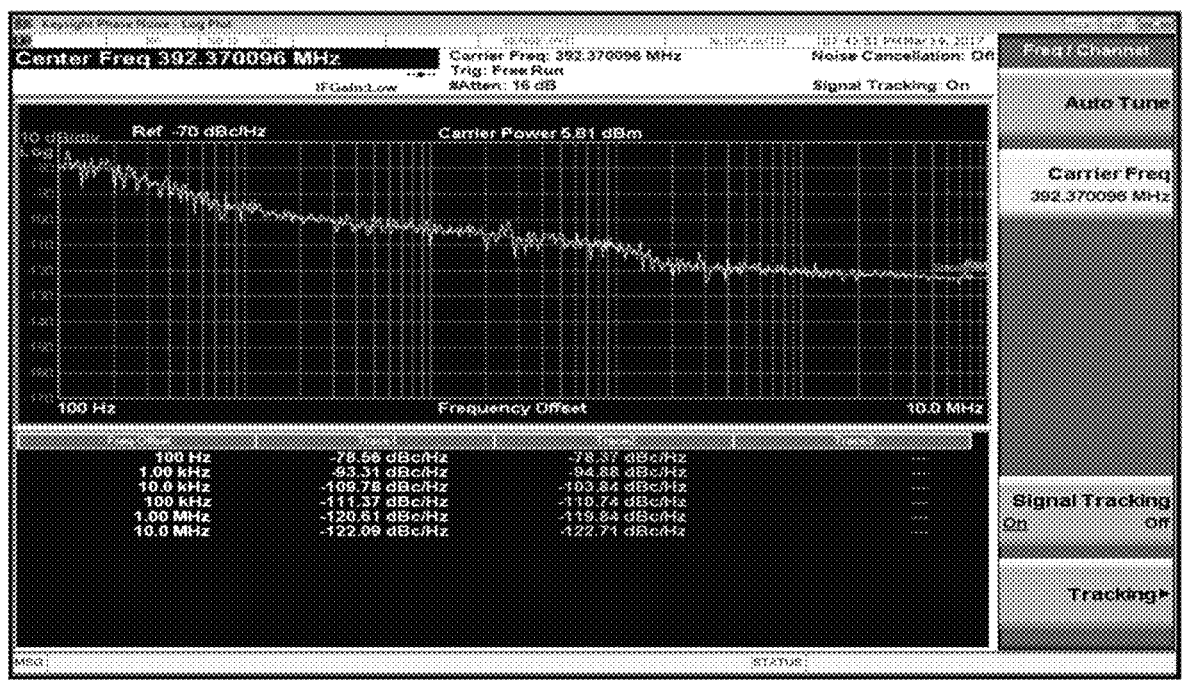
Figure 31: Rx Single Sideband Phase Noise for L-Band at IF = 392.5 MHz

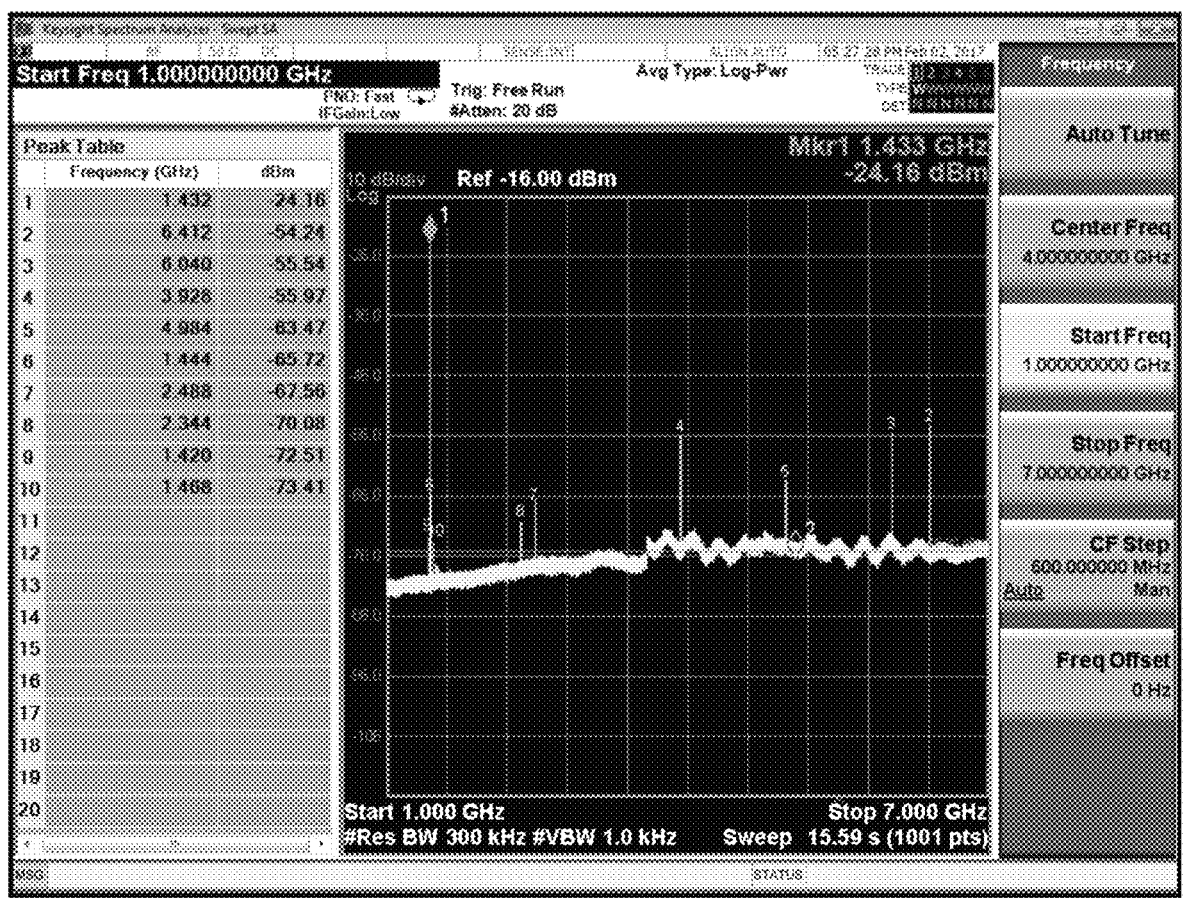
Figure 32: Tx Spurious Sum at L-Band (1432 MHz)

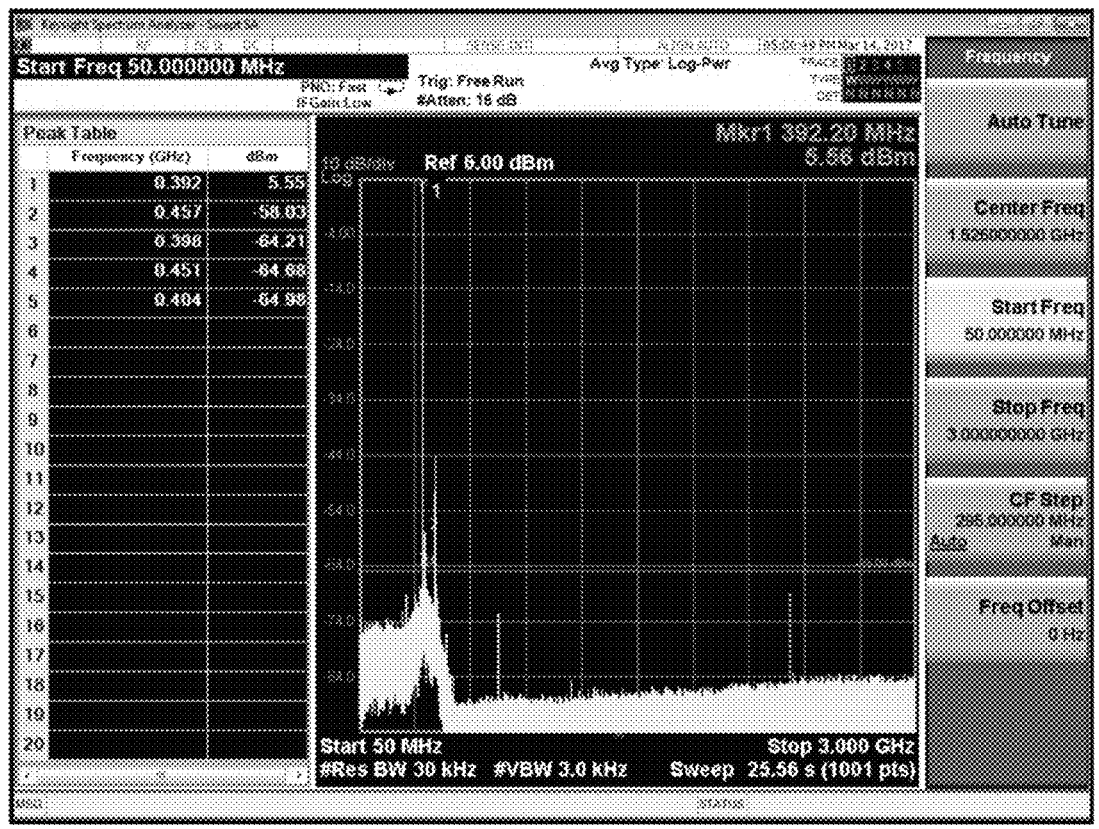
Figure 33: Rx Spurious Sum for L-Band (1485 MHz) at IF = 392.5 MHz
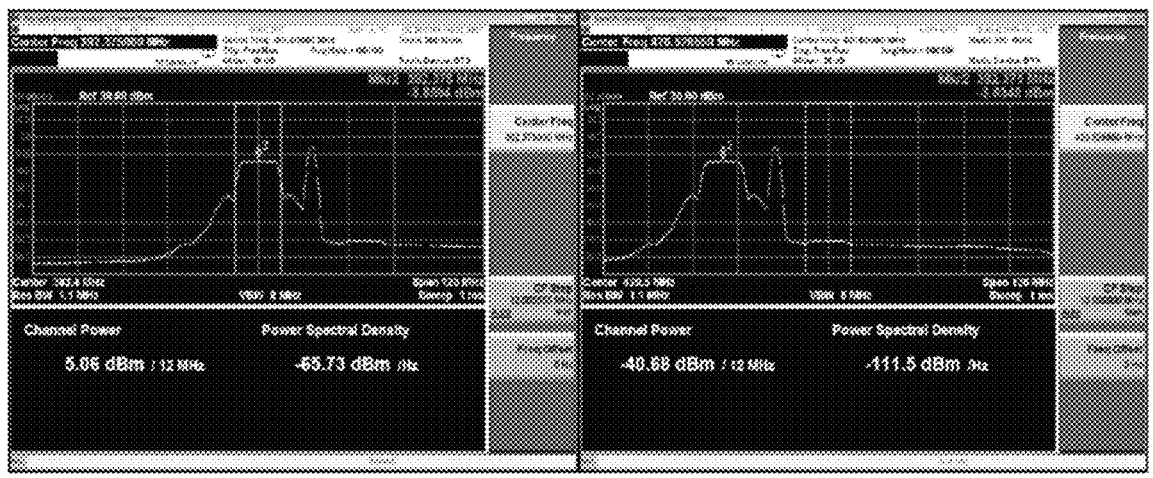
Figure 34: S1-band C/N$_o$, Signal of Interest Power (Left), Noise Power (Right)

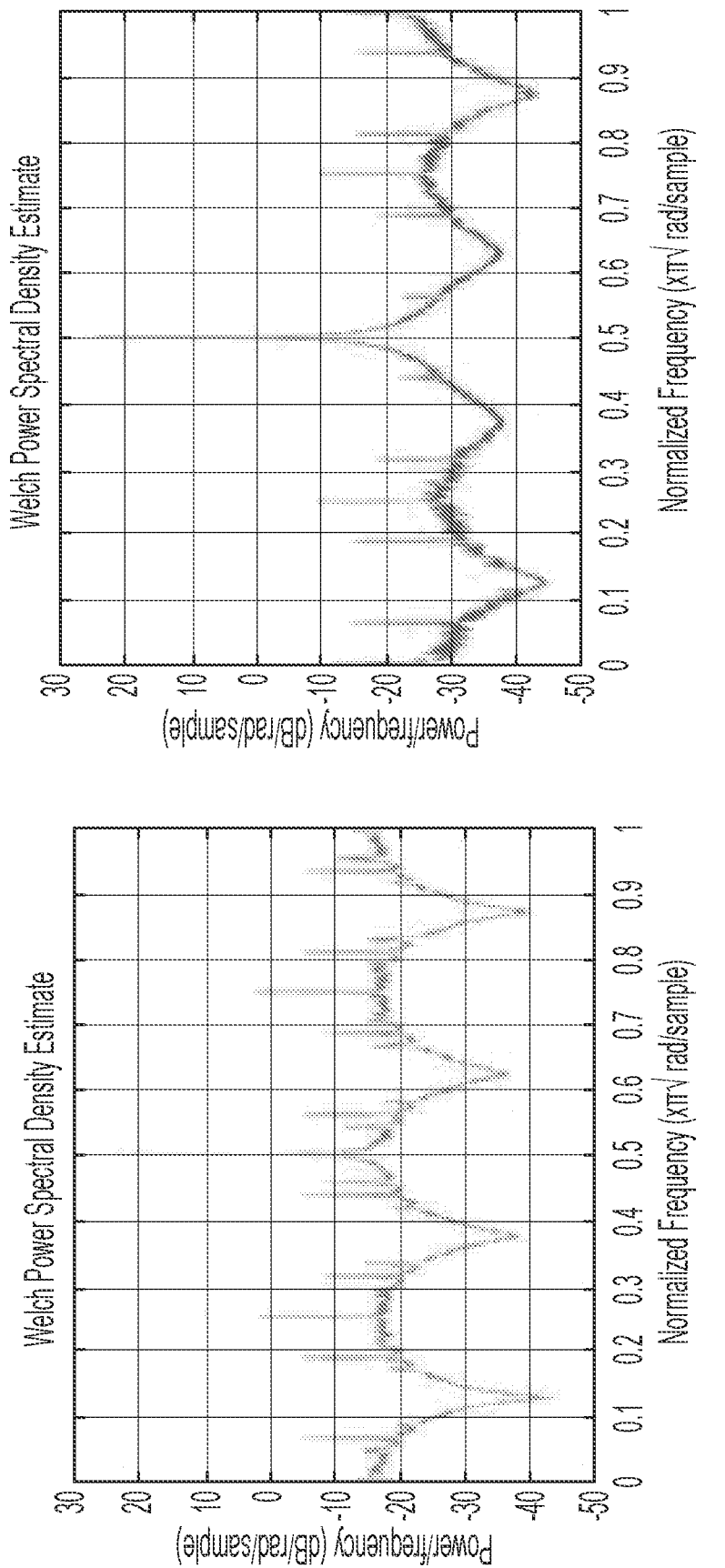
Figure 35: Analog IF Spur Sampled at Fs/2, 1535 MHz Rx (Left), 1485 MHz (Right)

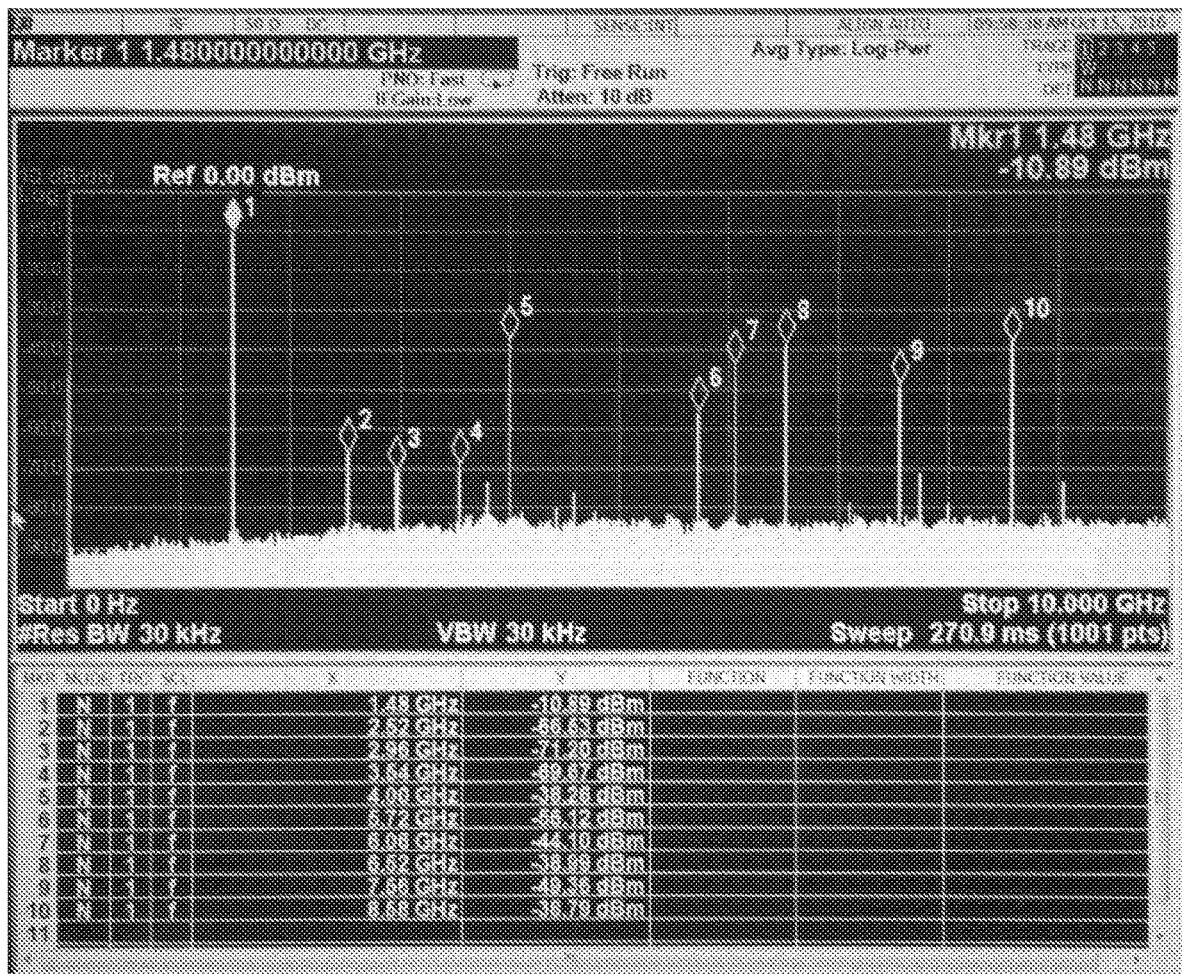
Figure 36: Actual Output Spectrum (Wideband) of Tx Channel with RF = 1485 MHz & IF = 1032 MHz

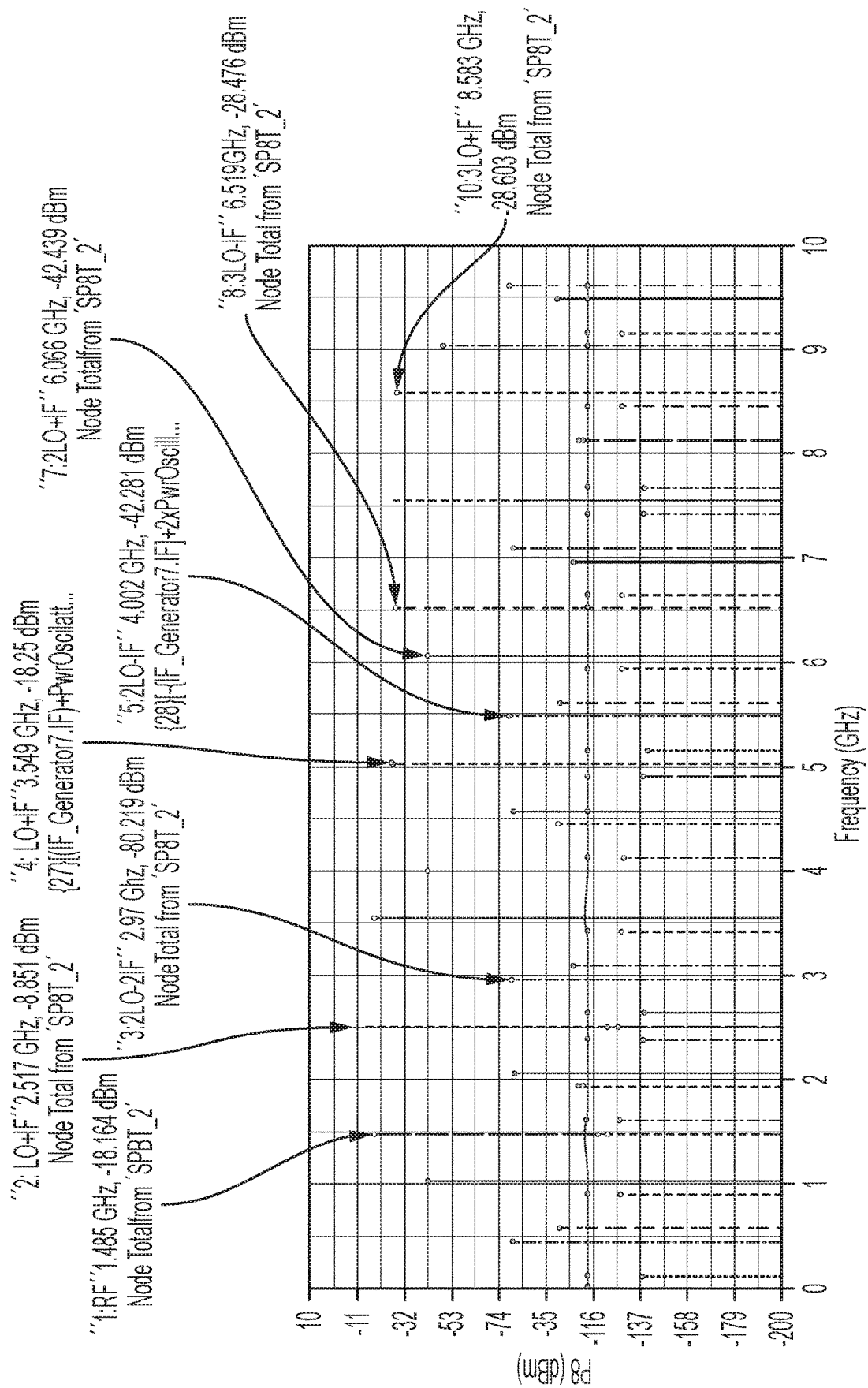
Figure 37: Simulated Output Spectrum of Tx Channel with RF = 1485 MHz & IF = 1032 MHz

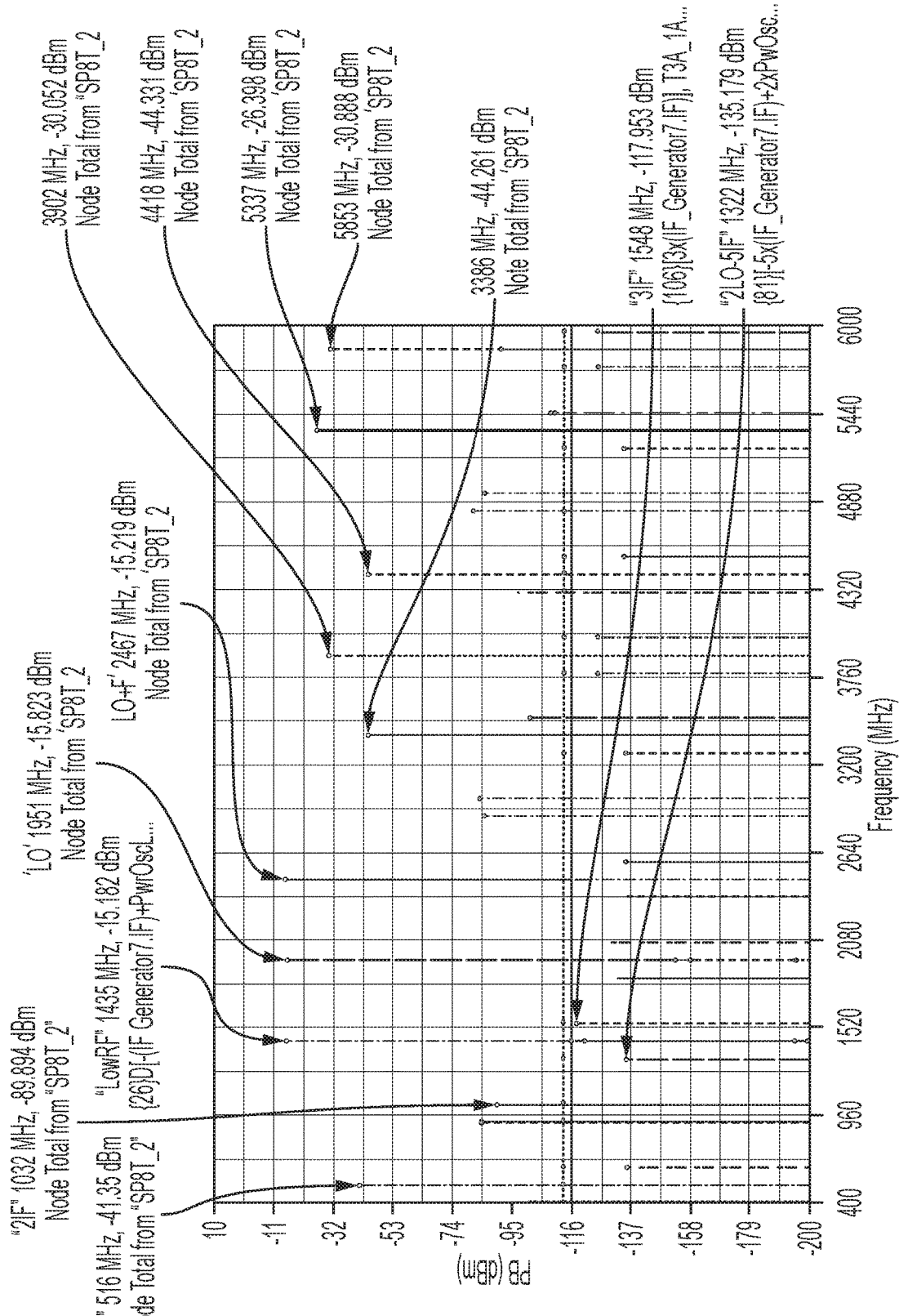
Figure 38: Simulated Output Spectrum of Modified Tx Channel with RF = 1435 MHz and IF = 516 (without RF filter)

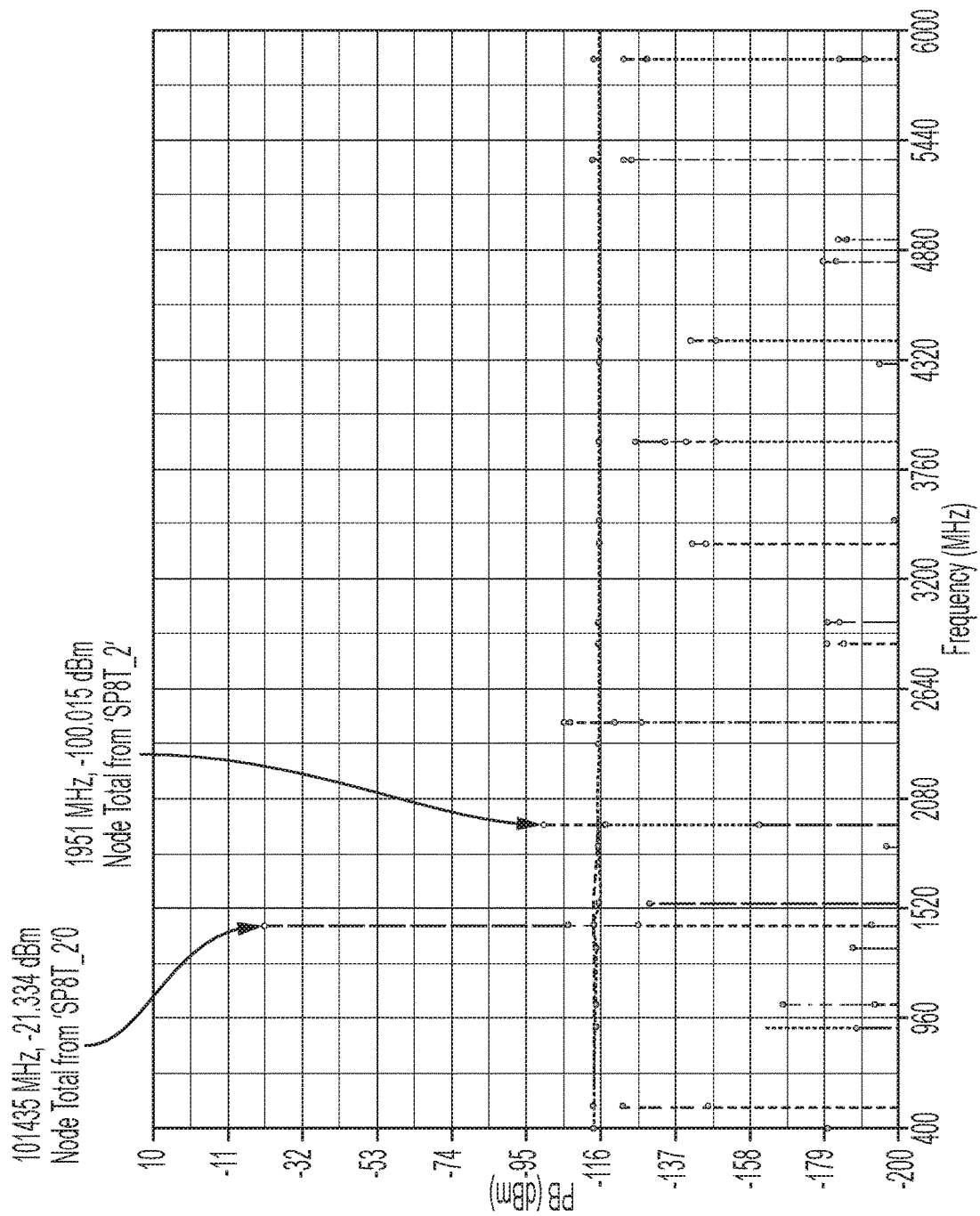
Figure 39: Simulated Output Spectrum of Modified Tx Channel with RF = 1435 MHz and IF = 516 (with RF filter)

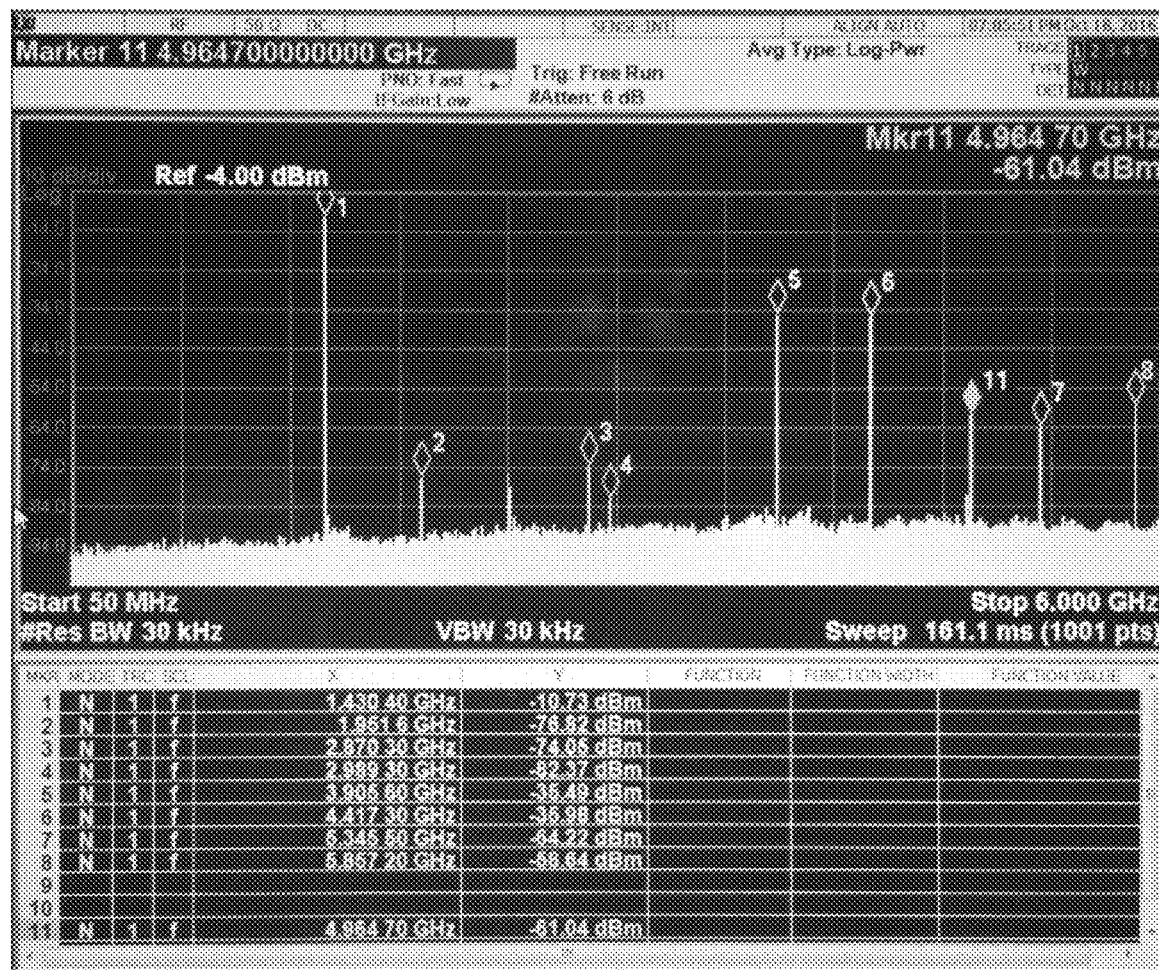
Figure 40: Measured Output Spectrum of Tx Channel with RF = 1435 MHz and IF = 516 MHz (without RF filter)

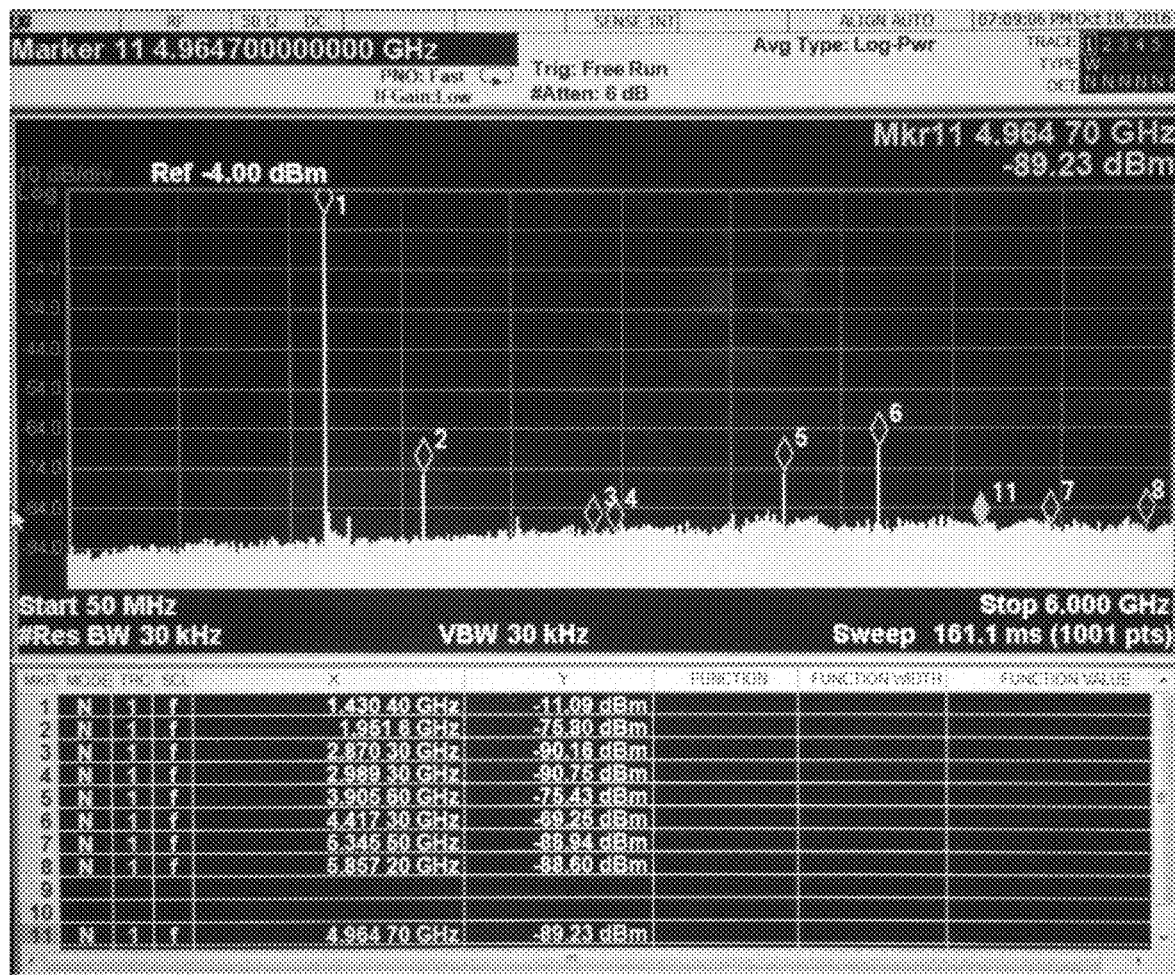
Figure 41: Measured Output Spectrum of Tx Channel with RF = 1435 MHz and IF = 516 MHz (with RF filter)

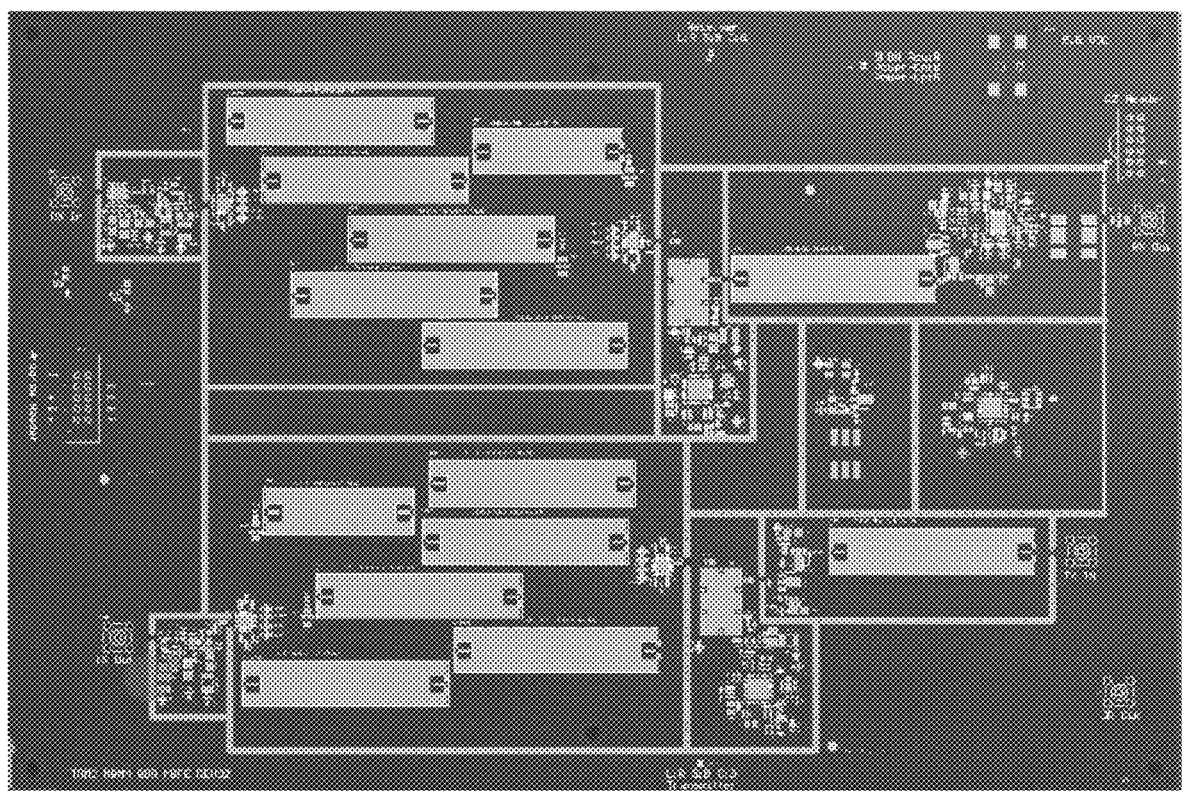
Figure 42: 3D Model of MBFE Revision 2 PCB Shield Footprint
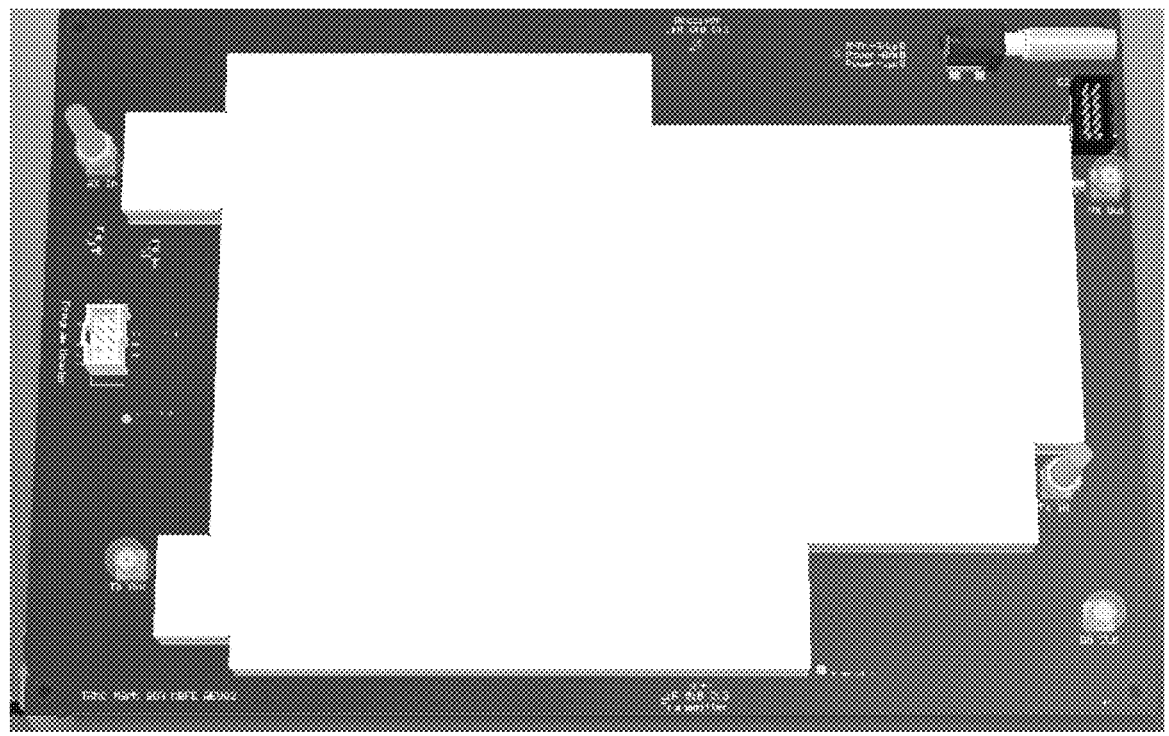
Figure 43: 3D Model of MBFE Revision 2 PCB with Shield Step Model

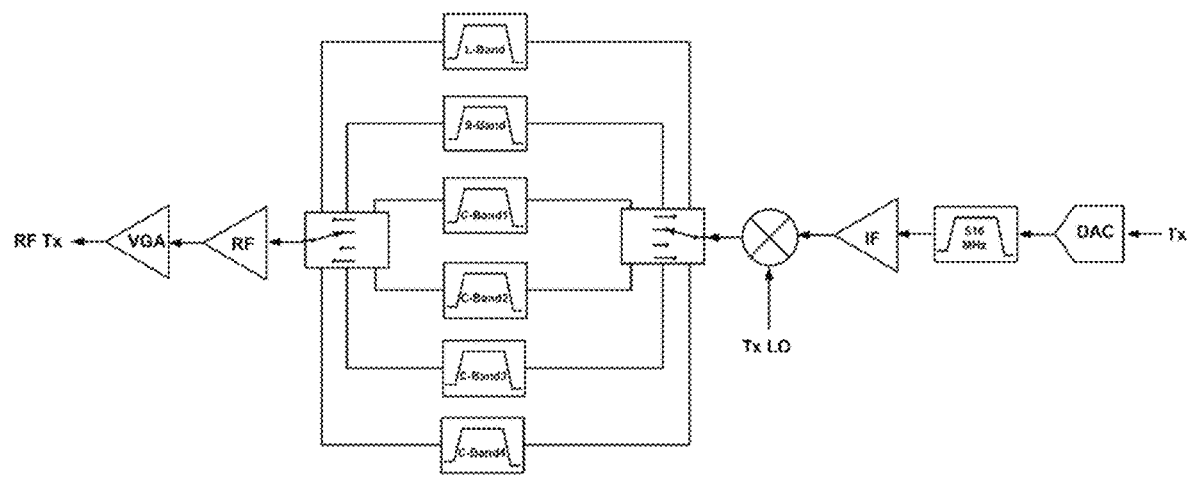
Figure 44: Tx Channel Block Diagram for MFBE Revision 2 PCB
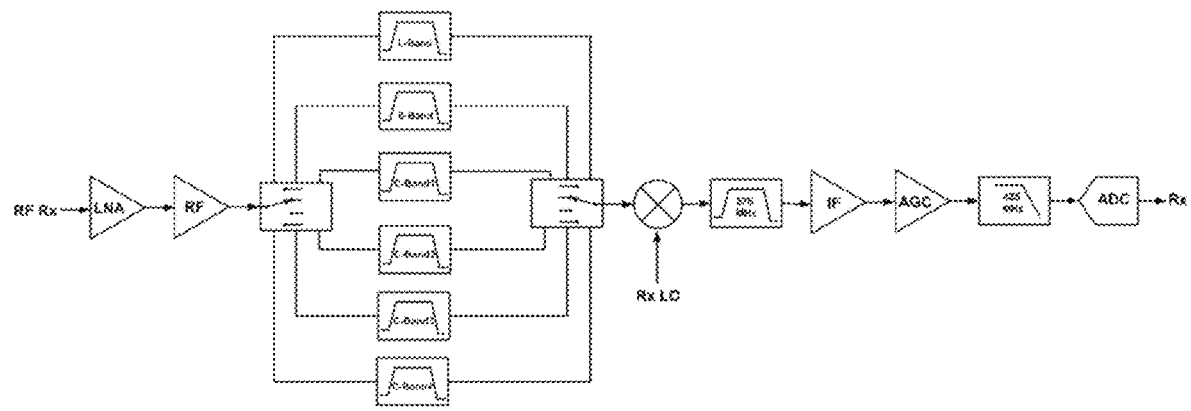
Figure 45: Rx Channel Block Diagram for MFBE Revision 2 PCB

MULTI-BAND MULTI-MODE SOFTWARE DEFINED RADIO

GOVERNMENT LICENSE RIGHTS

This invention was made with Government support under contract no. W900KK-12-C-0048 awarded by the Department of the Army. The U.S. Government has certain rights in the invention.

BACKGROUND OF THE INVENTION

Field of the Invention

The present invention relates to multi-band multi-mode software defined radios.

SUMMARY OF THE INVENTION

The multi-band, multi-mode software defined radio (MBMM SDR) platform of the present invention preferably consists of four subsystems: a multi-band front end (MBFE), a multi-mode digital radio (MMDR), a configuration & control (C2) subsystem, and a power distribution subsystem as illustrated in FIG. 1. The MBFE provides wideband operations, L/S/C-Band telemetry band selection, and channel tuning. The MMDR provides high-speed signal processing and flexible programming to support multiple telemetry waveforms that are implemented using system-on-chip (SoC) technology. An integrated pulse code modulation/frequency modulation (PCM/FM) and shaped offset quadrature phase shift keying (SOQPSK-TG) transmitter and a non-coherent PCM/FM receiver has been developed. The C2 subsystem allows for pre-test configuration and control of the MBFE and MMDR subsystems. The power distributed subsystem generates all required voltages and currents from a +28-V input supply.

The printed circuit board (PCB) preferably has an RF side and a digital side. The RF side implements the transmitter and receiver channels, which includes wide-band RF amplification, L/S/C-band filter banks, frequency translation, and IF filtering and amplification.

The digital side implements the hardware circuitry for the C2 and power distribution subsystems. The C2 subsystem includes the MBFE controller (MBFE CTRL) for configuring the filter banks and frequency synthesizers, interfacing with the C2 core software hosted on the SoC, and controlling the power sequencing of the platform.

Multi-band Operation: Multi-band operation consists of telemetry band selection and channel tuning within L/S/C-band allocations. Telemetry band selection is implemented using a filter bank architecture. Each telemetry band allocation has been segmented into 100-MHz band allocations. As a result, eleven (11) configuration modes have been defined to provide telemetry band selection across the L/S/C-band allocations.

For the transmitter, channel tuning is implemented using analog frequency translation. Based on a telemetry band selection, the channel offset frequency is used to tune to the channel center frequency within the 100-MHz allocation. Each telemetry band allocation is segmented into 1-MHz step sizes for channel tuning. This frequency step size corresponds to the minimum data rate configuration mode for the MBMM SDR platform.

BRIEF DESCRIPTION OF THE DRAWINGS

FIG. 1 shows a block diagram of a multi-band multi-mode software defined radio (MBMM SDR) according to an embodiment of the invention.

FIG. 2: is a color photograph of a MBMM SDR Platform according to an embodiment of the invention.

FIG. 3 is a representation of an RF side of a Multi-band Front End (MBFE) Board Layout according to an embodiment of the invention.

FIG. 4 is a representation of the digital side of an MBFE Board Layout according to an embodiment of the invention.

FIG. 5 is a color photograph of a ZC706 Evaluation Board according to an embodiment of the invention.

FIG. 6 is a representation of Telemetry Band Configuration Modes according to an embodiment of the invention.

FIG. 7 is a representation of Transmitter Channel Tuning according to an embodiment of the invention.

FIG. 8 is a representation of Channelizer Design Methodology according to an embodiment of the invention.

FIG. 9A is the upper left hand quadrant of a block diagram of a Multi-Band Front-End (MBFE) according to an embodiment of the invention.

FIG. 9B is the upper right hand quadrant of a block diagram of a Multi-Band Front-End (MBFE) according to an embodiment of the invention.

FIG. 9A is the lower left hand quadrant of a block diagram of a Multi-Band Front-End (MBFE) according to an embodiment of the invention.

FIG. 9A is the lower right hand quadrant of a block diagram of a Multi-Band Front-End (MBFE) according to an embodiment of the invention.

FIG. 10 is a block diagram of a Multiband Front End Transmitter according to an embodiment of the invention.

FIG. 11 is a block diagram of a Multiband Front End Receiver according to an embodiment of the invention.

FIG. 12 is a block diagram of a Frequency Synthesizer according to an embodiment of the invention.

FIG. 13: is a block diagram of an MBFE Controller according to an embodiment of the invention.

FIG. 14: is a block diagram of a multi-mode digital radio (MMDR) according to an embodiment of the invention.

FIG. 15 is a representation of Tx Chain Common Hardware Architecture according to an embodiment of the invention.

FIG. 16 is a representation of MMDR Tx Firmware Design according to an embodiment of the invention.

FIG. 17 is a representation of PCM/FM & SOQPSK-TG Frequency & Phase Pulse Filter responses according to an embodiment of the invention.

FIG. 18 is a block diagram of a Tx Digital Front-End according to an embodiment of the invention.

FIG. 19 is a representation of DAC Output Spectrum according to an embodiment of the invention.

FIG. 20 shows a Tx Spectrum Left & Right: 2352 MHz with OCW Measurement & Scatter Plot according to an embodiment of the invention.

FIG. 21 shows an Rx Data Rate Architecture according to an embodiment of the invention.

FIG. 22 shows representative Rx Channelization Architecture according to an embodiment of the invention.

FIG. 23A shows a representative Rx Digital Back-end Architecture according to an embodiment of the invention.

FIG. 23B shows representative frequency and impulse responses of a differentiator filter according to an embodiment of the invention.

FIG. 24 is a block diagram of a System Framework according to an embodiment of the invention.

FIG. 25 shows an example of a Software Stack according to an embodiment of the invention.

FIG. 26 shows an example of a Boot Sequence Framework according to an embodiment of the invention.

FIG. 27 is a diagram of a Configuration Framework according to an embodiment of the invention.

FIG. 28 is a diagram of a Control and Status Framework according to an embodiment of the invention.

FIG. 29 is a block diagram of a Power Distribution framework according to an embodiment of the invention.

FIG. 30 shows a Tx Single Sideband Phase Noise at L-Band (1485 MHz) according to an embodiment of the invention.

FIG. 31 shows an Rx Single Sideband Phase Noise for L-Band at IF=392.5 MHz according to an embodiment of the invention.

FIG. 32 shows a Tx Spurious Sum at L-Band (1432 MHz) according to an embodiment of the invention.

FIG. 33 shows an Rx Spurious Sum for L-Band (1485 MHz) at IF=392.5 MHz according to an embodiment of the invention.

FIG. 34 shows an S1-band $C/N_o$, Signal of Interest Power (Left), Noise Power (Right) according to an embodiment of the invention.

FIG. 35 shows Analog IF Spur Sampled at Fs/2, 1535 MHz Rx (Left), 1485 MHz (Right) according to an embodiment of the invention.

FIG. 36 shows Actual Output Spectrum (Wideband) of Tx Channel with RF=1485 MHz & IF=1032 MHz according to an embodiment of the invention.

FIG. 37 shows Simulated Output Spectrum of Tx Channel with RF=1485 MHz & IF=1032 MHz according to an embodiment of the invention.

FIG. 38 shows Simulated Output Spectrum of Modified Tx Channel with RF=1435 MHz and IF=516 (without RF filter) according to an embodiment of the invention.

FIG. 39 shows Simulated Output Spectrum of Modified Tx Channel with RF=1435 MHz and IF=516 (with RF filter) according to an embodiment of the invention.

FIG. 40 shows Measured Output Spectrum of Tx Channel with RF=1435 MHz and IF=516 MHz (without RF filter) according to an embodiment of the invention.

FIG. 41 shows Measured Output Spectrum of Tx Channel with RF=1435 MHz and IF=516 MHz (with RF filter) according to an embodiment of the invention.

FIG. 42 shows a 3D Model of MBFE Revision 2 PCB Shield Footprint according to an embodiment of the invention.

FIG. 43 shows a 3D Model of MBFE Revision 2 PCB with Shield Step Model according to an embodiment of the invention.

FIG. 44 is a block diagram of a Tx Channel for MFBE Revision 2 PCB according to an embodiment of the invention.

FIG. 45 is a block diagram for an Rx Channel for MFBE Revision 2 PCB according to an embodiment of the invention.

DETAILED DESCRIPTION

1.0 System Overview

The multi-band, multi-mode software defined radio (MBMM SDR) platform of the invention preferably consists of four subsystems: a multi-band front end (MBFE), a multi-mode digital radio (MMDR), a configuration & control (C2) subsystem, and a power distribution subsystem as illustrated in FIG. 1. The MBFE provides wideband operations, L/S/C-Band telemetry band selection, and channel tuning. The MMDR provides high-speed signal processing and flexible programming to support multiple telemetry waveforms that are implemented using system-on-chip (SoC) technology. An integrated pulse code modulation/frequency modulation (PCM/FM) and shaped offset phase quadrature shift keying (SOQPSK-TG) transmitter and a non-coherent PCM/FM receiver has been developed. The C2 subsystem allows for pre-test configuration and control of the MBFE and MMDR subsystems. The power distributed subsystem generates all required voltages and currents from a +28-V input supply.

The MBMM SDR platform may be integrated into a 19"×22"×3U rack-mount unit consisting of three main hardware units: a MBFE board, an Xilinx ZC706 evaluation board, and a DC-to-DC module.

1.1 Hardware Unit

Multi-Band Front-End Board:

The MBFE board is preferably a two-sided custom printed circuit board (PCB). The RF side implements the transmitter and receiver channels, which includes wide-band RF amplification, L/S/C-band filter banks, frequency translation, and IF filtering and amplification. The RF side of the MBFE board layout is shown in FIG. 3.

The digital side implements the hardware circuitry for the C2 and power distribution subsystems. The C2 subsystem includes the MBFE controller (MBFE CTRL) for configuring the filter banks and frequency synthesizers, interfacing with the C2 core software hosted on the SoC, and controlling the power sequencing of the platform. The digital side of the MBFE board layout is shown in FIG. 4.

Xilinx ZC706 Evaluation Board:

The C2 and MMDR subsystems may be implemented within a single hardware unit consisting of the Xilinx ZC706 evaluation board with an FMC-110 high-speed data conversion daughter card as shown in FIG. 5. The evaluation board hosts the Xilinx Zynq-7000 All-Programmable SoC, in which the platform design utilizes the following hosted resources:

Dual ARM Cortex Processing System (PS)
  Kintex-7 FPGA Programmable Logic (PL)
  High-speed PS-PL data interfaces
  Hardware Drivers: QSPI, UART, I2C, SD, DDR, and
    Gigabit Ethernet The FMC110 daughter card consists of dual 12-bit 1-GSPS analog-to-digital converters (ADC), dual 16-bit 1-GHz digital-to-analog converter (DAC), and clock generation circuitry. Modification of the FMC110 interface card may be required for the ZC706 board. A modified FMC-110 interface card is referred to herein as the FMC706.

DC-to-DC Module:

This module is a system-level dc-to-dc converter of the type made by Vicor Corporation with the part number VI-RC1W11-CYXY. The module inputs +28V and generates the following regulated maximum outputs:

50-W, +5.5V supply for the MBFE board
  75-W, +12V supply for the Xilinx ZC706 evaluation
    board
  50-W, +12V supply for the chassis cooling fans 1.2 Design Methodology Multi-Band Operation:

Multi-band operation consists of telemetry band selection and channel tuning within L/S/C-band allocations. Telemetry band selection is implemented using a filter bank architecture. Each telemetry band allocation has been segmented into 100-MHz band allocations. As a result, eleven (11) configuration modes have been defined to provide telemetry band selection across the L/S/C-band allocations as illustrated in FIG. 6.

For the transmitter, channel tuning is implemented using analog frequency translation. Based on a telemetry band selection, the channel offset frequency is used to tune to the channel center frequency within the 100-MHz allocation. Each telemetry band allocation is segmented into 1-MHz step sizes for channel tuning. This frequency step size corresponds to the minimum data rate configuration mode for the MBMM SDR platform. The design methodology is illustrated in FIG. 7.

For the receiver, channel tuning is based on stages of selective filters that were designed based on the 90%-power bandwidth specification for the telemetry waveform. The process, after data conversion, shifts the 100-MHz bandwidth set by the MBFE subsystem to DC through a simplified coarse translation stage; this is due to having the IF spectrum located at Fs/4 of a Nyquist zone based on analog frequency translation. Multiple stages of filtering reduce the data rate while at the same time selectively filtering the channel of interest. The design methodology for the channelizer is illustrated in FIG. 8.

Multi-Mode Operation:

A driving requirement for the platform is the ability to support future spectrum efficient waveforms for next-generation telemetry applications. As a result, the MMDR implements Field Programmable Gate Array (FPGA) technology to support the following system-level requirements:

Radio Configuration: The platform shall enable multiple radio personalities in order to support multiple mission requirements with a single hardware platform.

Telemetry Modulation: The platform shall support telemetry modulations as defined by IRIG-106-11 Standard in order to support integration into legacy telemetry systems.

High Data Rate: The MBMM SDR shall be designed for a goal of supporting data rates up to 50 Mbps in order to support the increasing data growth of modern test articles.

To meet these requirements, the following configuration modes were implemented in the MMDR subsystem:

PCM/FM Transmitter, Date Rate=9.81 Mbps
SOQPSK-TG Transmitter, Date Rate=9.81 Mbps
Non-coherent PCM/FM Receiver, Data Rate=9.81 Mbps

2.0 System Design

2.1 Multi-Band Front-End

The multi-band front end (MBFE) is an integration of multiple modules as shown in FIG. 9:

TX Wideband Front-End (TX_WBFE): Provides RF amplification across the 1000 MHz to 6000 MHz spectrum and a variable gain control (VGA).

TX Adaptive Filter Bank (TX_AFB): Provides telemetry band selection using a static filter bank.

TX Channel Tuning (RX_CT): Provide frequency translation with IF filtering and amplification.

RX Wideband Front-End (RX_WBFE): Provides RF amplification across the 1000 MHz to 6000 MHz spectrum.

RX Adaptive Filter Bank: Provides telemetry band selection using a static filter bank with integrated adaptive filters.

RX Channel Tuning (RX_CT): Provides frequency translation with IF filtering and amplification.

Frequency Synthesizer (FREQ_SYNTH): Generates the local oscillators (LOs) for the Tx and Rx channels, and a reference signal for the MMDR subsystem.

MBFE Controller (MBFE_CTRL): Provides configuration and control of the MBFE.

2.1.1 RF Transceiver

The RF transceiver consists of the transmitter (Tx) and receiver (Rx) channels, which provides the full-duplex communications. The block diagrams are illustrated in FIG. 10 & FIG. 11. The Tx channel begins with data conversion of the modulated baseband signal from MMDR. The 1020-MHz signal is filtered to remove the unwanted DAC replicas, and IF amplification is perform for efficient frequency translation. After the frequency translation stage, telemetry band selection is performed using a filter bank. Additional RF amplification is performed that includes a variable gain amplifier (VGA) that allows for adjustment of the output power based on the specifications of an external power amplifier.

The Rx channel begins with a low-noise amplification stage for minimum impact to the signal-to-noise (SNR) of the upcoming signal. Telemetry band selection is performed using a filter bank with integrated adaptive filters. The red box illustrates an optional portion of the filter bank that may be bypassed due to its lack of necessity to meet receiver specifications. Finally, the RF signal is frequency translated and filtered to 392.5 MHz with power level of ~9 dBm for data conversion and interfacing with the MMDR subsystem.

2.1.2 Frequency Synthesizers

The frequency synthesizers were implemented using of a fractional-N phase-locked loop (PLL) synthesizer (HMC833LP6GE) as illustrated in FIG. 12. Two synthesizers generate the local oscillators (LOs) for Tx and Rx channels of the MBFE subsystem, and the other synthesizer generates the reference signal for the MMDR subsystem. A 40-MHz temperature-controlled crystal oscillator (TCXO-Vectron VT-804) is used as the external reference for each synthesizer. Signal amplification (HMC740SC89E) of the TCXO output is required to meet the specification for the frequency synthesizer. At the output of the Tx and Rx synthesizers, additional signal amplification (HMC311SC70) was implemented to meet the specification for the MBFE mixers.

Key specifications for the frequency synthesizers are:
HMC833LP6GE Overview:
Fractional-N PLL with integrated VCO
Frequency range: 25=MHz to 6000 MHz
Phase Noise: −119 dBc/Hz @ 100 kHz offset
24-bit step size (3-Hz Resolution)

Frequency planning for telemetry selection and channel tuning were validated, and embedded software was developed for the MBFE CTRL. Based on configuration commands from the C2 CORE software, the MBFE CTRL programs the registers of the frequency synthesizer. The commands are based on the design methodologies outlined for telemetry band selection and channel tuning.

2.1.3 MBFE Controller

The primary functionality of MBFE controller (MBFE CTRL) is to configure the hardware components for multi-band operations. The architecture of the MBFE CTRL is illustrated in FIG. 13. The red-enclosed portion of the architecture is optional, as it was implemented to control the adaptable filters within the MBFE Rx channel. The architecture is based on a 8-bit Atmel ATmega128 microcontroller that contains the firmware to perform the following tasks: 1) control the RF switches within the filter banks for telemetry band selection; 2) communicate with the on-board adjustable voltage dividers via Serial Peripheral Interface (SPI) protocol to provide control voltages for the Automatic Gain Control (AGC) and the Variable Gain Amplifier (VGA)

components; 3) configure the frequency synthesizers via SPI protocol; and 4) interfacing with C2 CORE software hosted on the Zynq SoC via I2C protocol.

2.2 Multi-Mode Digital Radio

The block diagram for the MMDR subsystem is illustrated in FIG. 14. The subsystem has been partitioned into the functional modules based on traditional transceiver architecture. Key components developed include:

Transmitter Channel
  Modulator: Integrated PCM/FM & SOQPSK-TG waveform for validation of multi-mode operation
  Firmware Framework: Shared modules between the telemetry waveforms for optimization of firmware resources
Receiver Channel
  Digital Front-End: Modules for channelization.
  Digital Back-End: Non-coherent demodulation using a discriminator with symbol-timing synchronization 2.2.1 Transmitter Channel An integrated PCM/FM & SOQPSK-TG transmitter was designed to support multi-mode operations as illustrated in FIG. 15. Shared components are implemented for optimization of firmware resources. In particular, the IRIG-106 randomizer and NRZ-L formatter are shared within the common architecture. For SOQPSK-TG, the differential encoder, Q-bit delay, and symbol precoder were implemented per IRIG-106 specifications. The phase filters used in the synthesis of the telemetry waveforms are a 2-symbol length raised cosine (2RC) filter for PCM/FM, and an 8-symbol length temporal raised cosine for SOQPSK-TG.

The firmware was designed based on a Read-Only Memory (ROM) structure for the calculation of the output of the continuous phase modulation (CPM) modulator. The transition from one phase state to another is based on the phase filter, which the value is pre-calculated and stored in the ROM tables. In addition, these ROMs perform 10× interpolation for a 9.81-Mbaud rate implementation. These components are highlighted in blue in FIG. 16. The responses of the phase filter are shown in FIG. 17.

Dynamic waveform selection between the PCM/FM and SOQPSK-TG waveforms is performed by setting the TX_MODE parameter within a memory map via the C2 subsystem. Based on the TX_MODE parameter, only one of the waveforms is clocked during runtime operation for power optimization. Pre-test data rate selection requires reconfiguration of the ROMs and interpolation stages. The current data rate (baud rate) of the Tx firmware is 9.81 MSymbols/s.

Several interpolation stages are required to interface with the Digital-to-Analog Converter (DAC) rate. The 2× interpolation stage within the DAC was utilized to minimize the speed of the FPGA-DAC interface as illustrated in FIG. 18. Additionally, IF signal selection was achieved by analog filtering the 3rdNyquist-zone DAC image within the MBFE subsystem. Current implementation locates the modulated IF signal at 1054.575 MHz for a clock rate of 784.8 MHz as illustrated in FIG. 18.

The closest image is located at 1299.8 MHz within the 4th Nyquist zone as illustrated in FIG. 19. For the current implementation of a 9.81 MSymbols/s, PCM/FM waveform and IF image suppression results in an spurious free dynamic range (SFDR) of 65 dB. For the a PCM/FM waveform at 25 Mbps, the frequency spacing and filtering provided at IF is sufficient in suppressing the image signal up to 40 dB.

The occupied bandwidth for both modes of modulation is compliant with IRIG-106 standards; the PCM/FM Tx signal at 99% power occupancy is at 1.2 of the data rate and the SOQPSK-TG stream, at 0.65 of the data rate. A confirmation of this is shown below in FIG. 20 for the PCM/FM waveform.

2.2.2 Receiver Channel

Non-coherent PCM/FM demodulation using a discriminator with symbol-timing synchronization was designed. The current data rate of the firmware expected to be received is 9.81 Mbps. The receiver channel implements several data rate changes throughout the channelization process to reduce the 100-MHz IF spectrum to 2 samples per symbol in preparation for demodulation. Resource utilization for the filters is kept to a minimum by time-sharing resources during down-sampling operations. The architecture for the data rate changes is illustrated in FIG. 21.

Based on the design methodology for channel tuning for the receiver, the IF spectrum is coarse translated to baseband with in-phase (I) and quadrature (Q) samples generation for complex signal processing as depicted in FIG. 22. After baseband translation, the channel selection is performed using selective channel filters based on the data rate configuration.

Demodulation is based on a non-coherent discriminator architecture shown in FIG. 23. The demodulation operates at the 99%-power bandwidth boundary. The maximum that a signal of interest would occupy at 2 samples per symbol is $3/5$ of the available bandwidth. Thus even with a 25 MSymbols/s baud rate, the discriminator filters would not alias the signal as the differentiator passband is 5*pi/8 cycles/sample, which is wide enough to not cut off the 99%-power bandwidth.

2.3 Configuration and Control

The C2 subsystem is integrated with the MMDR utilizing state-of-the-art SoC technology as illustrated in FIG. 24. As a result, C2 and MMDR have been implemented into a single hardware subsystem consisting of two operational planes:

Digital Radio Plane: Consists of the hardware and software components for high-speed signal processing of the telemetry waveforms.
C2 Plane: Consists of the hardware and software components for system booting, configuration and control of the MBFE and MMDR, memory, filesystem (FS) management, and system status monitoring.

Digital Plane:

The digital plane has been partitioned into the following components:

High-Speed Interface Firmware: Consists of the serializer and deserializer functionalities for the LVDS interface.
Waveform firmware: Consists of the functionalities for modulation, demodulation, and synchronization for the telemetry waveform.
Digital Radio GPP: Consists of the functionalities for data interfaces via Zynq Gigabit Ethernet controller (GIGE), which have not been developed.

C2 Plane:

The C2 plane has been partitioned into the following components:

Configuration and Control GPP: Consists of the general configuration and control software (C2 CORE SW) for booting, configuration, control, and status.
BOOTROM: Consists of the initial boot software, which includes the Linux kernel, Linux ramdisk loading, and golden firmware.
MBFE CTRL: Control/Status interface to MBFE CTRL. The transfer protocol is I2C.
CTRL: Control interface via UART interface.

SYS FS: The filesystem will host the configuration bit files for each mode of operation.

2.3.1 Software Stack

The embedded software is a Linux OS application based on Xilinx open-source distribution of Linux HW drivers. The system stack-up is illustrated in FIG. 25. The software stack consists of:

ARM0 GPP Core: C2 CORE SW for configuration & control of MBFE and MMDR.

ARM1 GPP Core: Host the software for digital radio interface.

Linux 3.10.0-Xilinx Kernel: Handles all memory management, process management, filesystem, and I/O hardware drivers utilized by ARM0 and ARM1.

2.3.2 Boot Sequence Framework

The boot sequence consists of the following elements mounted on the SD:

First-Stage Boot Loader (FSBL): Initialization of the PS & HW controllers, and loads the Golden Firmware into the PL.

Golden Firmware: Consists of the high-speed interface components that control the FMC110 card and provides data paths for the built-in self-test waveform.

U-Boot: Second-Stage Boot Loader (SSBL) for loading the Linux Kernel mounted on the SD. In addition, it provides lower-level access to hardware components.

Linux Kernel: Loads the RAMDISK FS consisting of the Linux drivers for HW controllers.

2.3.3 Configuration Framework

Configuration is performed by using individual applications & firmware files mounted on the SD card. Each operational mode of the MBMM SDR platform corresponds to a loadable bit file via C2 CORE SW as illustrated in FIG. 27.

2.3.4 Control & Status Framework

The C2 CORE SW handles the initialization and coordination utilizing the following components:

MBFE CTRL: An independent microcontroller that controls MBFE subsystem.

PL Memory Map: Config, Ctrl, and Status Registers for the PL side of the Digital Radio (DR) Plane.

PS Memory Map: Config, Ctrl, and Status Registers for the PS side of the Digital Radio (DR) Plane, which was not developed.

MBFE CTRL is implemented as stand-alone microcontroller for the MBFE subsystem, which includes the AGC amplifier, the VGA, and the frequency synthesizers. Memory maps are used for control and status between the PS and PL. The hardware architecture for the control and status framework is illustrated in FIG. 28.

2.4 Power Distribution

The architecture for the power distribution subsystem is based on system-level DC-to-DC module that will convert+ 28 V to a +5.5-V supply for the MBFE board, a +12-V supply for the Xilinx ZC706 evaluation board, and +12-V supply for the chassis fans. For the MBFE subsystem, a custom power generation module has been designed as illustrated in FIG. 29. The module consists of several power regions: the digital control, the Rx channel, the Tx channel, and synthesizers. Power sequencing has been incorporated to ensure proper power up and power down of components (sequencing numbering is denoted), which is controlled by the C2 subsystem via the MFBE CTRL.

3.0 System Verification

3.1 Phase Noise

A phase noise testing was performed for the transmitter (Tx) and the receiver (Rx) channels for IRIG-106 compliance. The measurement for the Tx channel was done at the center frequencies of each channel and the measurement for the Rx channel was done at the IF (392.5 MHz) following down-conversion from the center frequency of each channel. Due to the effect of the "½ harmonic" of the LO being present, for some C-Band channels the measurements could not be completed. This is denoted in the table by "Spur Interference".

Transmitter IRIG-106 Specification:

For bit rates greater than 4 Mb/s, the phase noise (PSD) shall be less than −100 dBc/hertz (Hz) between 1 MHz and one-fourth of the bit rate. In this case one-fourth of the bit rate is 2.5 MHz. The graph in FIG. 30 shows the phase noise measurement performed at 1485 MHz. The results at the center frequency of all other channels are presented in Table 1.

TABLE 1

Tx Single Sideband Phase Noise at the Center Frequencies of Each Channel

| Channel | $F_e$ | 1-MHz Offset | 10-MHz Offset |
|---|---|---|---|
| L-Band | 1485 MHz | −121.77 dBc/Hz | −109.37 dBc/Hz |
| S-Band 1 | 2245 MHz | −118.67 dBc/Hz | −108.35 dBc/Hz |
| S-Band 2 | 2352.5 MHz | −120.44 dBc/Hz | −108.62 dBc/Hz |
| C-Band 1 | 4450 MHz | Spur Interference | Spur Interference |
| C-Band 2 | 4550 MHz | Spur Interference | Spur Interference |
| C-Band 3 | 4650 MHz | −116.60 dBc/Hz | −105.68 dBc/Hz |
| C-Band 4 | 4750 MHz | −113.48 dBc/Hz | −104.93 dBc/Hz |
| C-Band 5 | 4850 MHz | −113.31 dBc/Hz | −106.13 dBc/Hz |
| C-Band 6 | 4890 MHz | −111.51 dBc/Hz | −106.30 dBc/Hz |
| C-Band 7 | 5141 MHz | −116.89 dBc/Hz | −108.38 dBc/Hz |
| C-Band 8 | 5200 MHz | −110.77 dBc/Hz | −106.50 dBc/Hz |

Receiver IRIG-106 Specification:

For bit rates greater than 4 Mb/s, the phase noise PSD shall be less than −103 dBc/Hz between 1 MHz and one-fourth of the bit rate. In this case, as well, one-fourth of the bit rate is 2.5 MHz. The graph in FIG. 31 shows the phase noise measurement performed at 392.5 MHz following a down-conversion from 1485 MHz. The results of all other channels are presented in Table 2.

TABLE 2

Rx Single Sideband Phase Noise at IF = 392 MHz

| Channel | $F_e$ (Before Conversion) | 1-MHz Offset | 10-MHz Offset |
|---|---|---|---|
| L-Band | 1485 MHz | −120.61 dBc/Hz | −122.09 dBc/Hz |
| S-Band 1 | 2245 MHz | −120.84 dBc/Hz | −124.80 dBc/Hz |
| S-Band 2 | 2352.5 MHz | −117.26 dBc/Hz | −119.59 dBc/Hz |
| C-Band 1 | 4450 MHz | −118.42 dBc/Hz | −122.20 dBc/Hz |
| C-Band2 | 4550 MHz | −118.91 dBc/Hz | −121.98 dBc/Hz |
| C-Band 3 | 4650 MHz | −121.21 dBc/Hz | −123.12 dBc/Hz |
| C-Band 4 | 4750 MHz | −119.30 dBc/Hz | −121.67 dBc/Hz |
| C-Band 5 | 4850 MHz | −118.34 dBc/Hz | −122.06 dBc/Hz |
| C-Band 6 | 4890 MHz | −118.52 dBc/Hz | −122.41 dBc/Hz |
| C-Band 7 | 5141 MHz | −120.13 dBc/Hz | −123.57 dBc/Hz |
| C-Band 8 | 5200 MHz | −120.61 dBc/Hz | −122.09 dBc/Hz |

3.2 Spurs Analysis

A wideband measurement was performed for the outputs of the Tx channel and Rx channel, respectively. The purpose of this measurement is to quantify the spur levels produced by the system. In some cases, significant spurs were produced by the mixing of signals produced by radiation from the Tx channel to the Rx channel and vice versa. These signals were not added to the sum of the other spurs, due to the fact that the PC board tested was a prototype, where radiation for an unshielded board would be expected. The power level of the most significant non-radiated spur was used to approximate the sum of all spurs. The requirements used for this measurement were also based on IRIG-106 specifications. The Tx channel did not meet these specifications because of added spurs produced by a significant LO/2 signal.

Transmitter IRIG-106 Specification:

The sum of all discrete spurious spectral components (single sideband) shall be less than −36 dBc. The graph in FIG. 32 shows the spurious measurement of the transmitter in the L-Band channel (1435 MHz). Table 3 shows the approximate sum of the spurs produced from transmission at all the other channels.

TABLE 3

Tx Spurious Sum

| Channel | $F_e$ | Approx. Sum of Spurs |
|---|---|---|
| L-Band | 1485 MHz | ~30 dBc |
| S-Band 1 | 2245 MHz | ~34 dBc |
| S-Band 2 | 2352.5 MHz | ~34 dBc |
| C-Band 1 | 4450 MHz | ~22 dBc |
| C-Band 2 | 4550 MHz | ~25 dBc |
| C-Band 3 | 4650 MHz | ~36 dBc |
| C-Band 4 | 4750 MHz | ~21 dBc |
| C-Band 5 | 4850 MHz | ~22 dBc |
| C-Band 6 | 4890 MHz | ~23 dBc |
| C-Band 7 | 5141 MHz | ~18 dBc |
| C-Band 8 | 5200 MHz | ~13 dBc |

Receiver IRIG-106 Specification:

The sum of all discrete spurious spectral components (single sideband) shall be less than −39 dBc. The graph in FIG. 33 shows the spurious measurement of the receiver at the IF (392.5 MHz) following a down-conversion from the L-Band center frequency 1485 MHz. Table 4 shows the approximate sum of the spurs produced at the IF=392.5 MHz for all the other channels.

TABLE 4

Rx Spurious Sum at IF = 392 MHz

| Channel | $F_e$ | Approx. Sum of Spurs |
|---|---|---|
| L-Band | 1485 MHz | ~63 dBc |
| S-Band 1 | 2245 MHz | ~59 dBc |
| S-Band 2 | 2352.5 MHz | ~58 dBc |
| C-Band 1 | 4450 MHz | ~48 dBc |
| C-Band 2 | 4550 MHz | ~75 dBc |
| C-Band 3 | 4650 MHz | ~39 dBc |
| C-Band 4 | 4750 MHz | ~42 dBc |
| C-Band 5 | 4850 MHz | ~60 dBc |
| C-Band 6 | 4890 MHz | ~36 dBc |
| C-Band 7 | 5141 MHz | ~70 dBc |
| C-Band 8 | 5200 MHz | ~32 dBc |

3.3 Carrier-to-Noise Density Ratio ($C/N_o$)

The carrier-to-noise density ratio ($C/N_o$) was measured for the received signal to determine the signal-to-noise ratio (SNR) available for demodulation. The noise bandwidth for this measurement was set at 99%-power bandwidth congruent to the IF bandwidth that the demodulator operates at. An additional signal within the band of interest was added to affect the noise level experienced within the 100-MHz IF bandwidth. This signal is seen to the right of Marker 2 in FIG. 34. Measurements for all bands were taken with this configuration. The results are shown below in Table 5. Due to the effect of the "½ harmonic" of LO being present, for some C-Band channels the measurements could not be completed. This is denoted in the table by "Spur Interference".

TABLE 5

$C/N_o$ Measurement

| Channel | Band Designation | $C/N_o$ | $E_b/N_a$ |
|---|---|---|---|
| L-Band | L | 47.6 | 50.6 |
| S-Band 1 | S1 | 45.6 | 47.6 |
| S-Band 2 | S2 | 44.8 | 47.8 |
| C-Band 1 | C1 | 45.6 | 48.6 |
| C-Band 2 | C2 | 44.8 | 47.8 |
| C-Band 3 | C3 | 44.5 | 47.5 |
| C-Band 4 | C4 | Spur Interference | Spur Interference |
| C-Band 5 | C5 | Spur Interference | Spur Interference |
| C-Band 6 | C6 | Spur Interference | Spur Interference |
| C-Band 7 | C7 | 43.42 | 46.42 |
| C-Band 8 | C8 | 40.4 | 43.4 |

The $C/N_o$ value can approximate the energy per bit to noise power spectral density (Eb/No) through the following equations:

$$\frac{E_s}{N_o} = \frac{T_{sym}}{T_{samp}} \times \frac{C}{N_o}$$

$$\frac{E_b}{N_o} = \frac{E_s}{N_o}$$

(for uncoded PCM/FM mapping is one-to-one)

$E_s/N_o$=Energy per Symbol to Noise Power Spectral Density $T_{sym}$=Symbol Period $T_{samp}$=Sample Period These results are based on the spur performance of the MBFE as indicated in Table 4. With improved performance of MBFE subsystem, improvement of $C/N_o$ performance is expected, which directly impact the demodulation and detection of the Rx channel. For example, FIG. 35 demonstrated SFDR within the digital radio. The spur levels is 20 dBc, at the worst condition for this mode of operation.

4.0 System Transition

Additional modifications to MBFE subsystem were completed to improve the overall system performance of the MBMM SDR platform. Fabrication and assembly of the MBFE Revision 2 PCB was carried out as described below to address the following issues:

1. The initial L-Band & S-Band RF filters lack the stop-band attenuation required to suppress the spurs to meet specifications due to a "½ harmonic" produced by the LO.
   The custom filters were changed to meet specific requirements and ensure suppression at particular frequencies.
   The PCB was updated so that a low pass filter is cascaded with some of the custom filters to add more attenuation to the stop-band.
   The combination of these two changes will add at least 20-30 dB more of suppression and ensures spur requirements are met.

2. Simulations showed that an IF between 450 MHz and 550 MHz will be the best trade off for pushing spurs further away from the fundamental. However, because of the decreased IF, the LO will be closer to the RF frequency.

The C-band was split into four, rather than into two, in order to relax the requirements of the filter and ensure that the LO will be in the stop-band.

As stated previously, the custom filters will have specific attenuation requirements based on the results obtained from the simulations.

A combination of these solutions will guarantee spurious suppression across the frequency range.

FIG. 36 and FIG. 37 illustrate the ability to reproduce the results from MBFE Revision 1 PCB in simulation for the frequency spectrum of the Tx channel.

Based on the simulation using actual S-parameters of the filters, the impact of these modifications are shown in FIG. 38 and FIG. 39.

As preliminary verification of the simulated results, measurements using the MBFE Revision 1 PCB were performed and are shown in FIG. 40 and FIG. 41.

3. Even though the spurs produced due to radiation is expected for a non-enclosed prototype board, a more efficient shielding method was used to increase the Rx channel performance.

Instead of doing individual shields around certain sections, the sensitive portions of the board (which operate at different frequencies) can be compartmentalized and therefore isolated from sections that may cause EMI problems.

During fabrication, the board will be prepared in such a way as to allow a custom, compartmentalized shield to be assembled on to it.

This, with the addition of filtering between potential conductive EMI paths, should provide isolation from both radiated and conductive interference for all RF sections of the board.

FIG. 42 and FIG. 43 illustrates the shielding for the MBFE Revision 2 PCB. The shielding should be able to protect all sensitive parts of the MBFE subsystem. This means that the entire Rx channel will be shielded from the LO of the Tx channel; the entire Tx channel will be shielded from the LO of the Rx channel; the RF and IF sections of the Tx channel will both be shielded from the Tx LO section and each other; and the RF and IF sections of the Rx channel will both be shielded from the Rx LO section and each other. This modification represents a cost-efficient enhancement toward a fully enclosed MBFE module.

4. Based on the preliminary performance of the MBFE Revision 1 PCB, the adaptable filter sections of the filter bank were removed from the MBFE subsystem and the control circuitry and software from the C2 subsystem.

Simplified block diagrams for the MBFE Revision 2 PCB are illustrated in FIG. 44 and FIG. 45.

5.0 Conclusion

A system framework for multi-band, multi-mode software-defined radio (MBMM SDR) platform is presented here. Advanced capabilities of multi-band and multi-mode operations were demonstrated for next generation telemetry applications.

MBMM SDR Platform Revision 1: A functional prototype consisting of the following hardware units: MBFE Revision 1 PCB, MMDR, and DC-DC power. Integrated system verification has been completed for three criteria: 1) phase noise 2) spur analysis and 3) carrier-to-noise density ratio. IRIG-106 specifications were used as the benchmark.

Tx Channel:
  Full compliance for phase noise
  Partial compliance for spur performance—C-Band
  Full compliance for spectral occupancy Rx Channel:
  Partial compliance for phase noise—C-Band
  Partial compliance for spur performance—C-Band
  Partial compliance for carrier-to-noise ratio performance—C-Band MBMM SDR Platform Revision 2: A functional prototype consisting of the following hardware units: MBFE Revision 2 PCB, MMDR, and DC-DC power. The integrated MBFE Revision 2 PCB was fabricated and assembled to address certain issues in the initial design.

Acronym Index:

| ACRONYM | FULL DESCRIPTION |
| --- | --- |
| MBMM | Multi-Band, Multi-Mode |
| SDR | Software Defined Radio |
| ConOp | Concept of Operation |
| SET | Spectrum Efficient Technology |
| SME | Subject Matter Expert |
| SE | Systems Engineering |
| PDR | Preliminary Design Review |
| SoC | System-on-a-Chip |
| ADC | Analog-to-Digital Converter |
| DAC | Digital-to-Analog Converter |
| DR | Digital Radio |
| C2 | Configuration and Control |
| RTOS | Real-Time Operating System |
| CDR | Critical Design Review |
| SRD | System Requirement Document |
| PEP | Project Execution Project |
| AFB | Adaptive Filter Bank |
| WBFE | Wideband Front End |
| CT | Channel Tuning |
| MBFE | Multi-band Front End |
| MMDR | Multi-Mode Digital Radio |
| MMBE | Multi-Mode Back End |
| SoC | System-on-a-Chip |
| PS | Processing System |
| PL | Programmable Logic |
| SW | Software |
| HW | Hardware |
| GPP | General Purpose Processor |
| FS | Filesystem |
| FSBL | First-Stage Boot Loader |
| SSBL | Second-Stage Boot Loader |
| VRT | VITA Radio Transport |
| FB | Filter Bank |
| CPM | Continuous Phase Modulation |
| Tx | Transmitter |
| Rx | Receiver |

The invention claimed is:

1. A multi-band multi-mode software-defined radio platform for telemetry applications comprising:
   a multi-band front-end (MBFE) having an L/S/C-band transceiver for telemetry band and channel selection based on adaptive filter bank structure and configured to generate an analog output;
   a multi-mode digital radio (MMDR) comprising digital design framework for signal processing the analog output of the MBFE for baseband modulation and for demodulation and detection of telemetry waveforms; and
   configuration and control (C2) hardware including embedded computer readable instructions for configuration and control of the MBFE and MMDR that includes dynamic and static operations.

2. The multi-band multi-mode software-defined radio platform according to claim 1, wherein the multi-band front-end includes:
- an operational RF bandwidth of 100 MHz within the following telemetry frequency bands: L-Band at 1435 MHz to 1535 MHZ, S-Band at 2200 MHz to 2395 MHz, and C-Band at 4200 MHz to 5250 MHz;
wherein
- the multi-band front end provides 1-MHz frequency resolution for channel selection within the operational RF bandwidth;
- band selection is performed using an adaptive filter bank structure, in which the S-Band and C-Band implements adaptive filters for increased selectivity of the receiver chain;
- the MBFE Controller (MBFE CTRL) configures the control voltage for the adaptive filters, filter bank switches, frequency synthesizers, variable gain amplifier (VGA), and the automatic gain control (AGC) amplifier, and
- the MBFE CTRL is controlled by the configuration and control (C2) hardware via an I2C interface.

3. The multi-band multi-mode software-defined radio platform according to claim 1, wherein the multi-mode digital radio (MMDR) includes:
- a transmitter modulator based on an integrated pulse code modulation/frequency modulation (PCM/FM) & shaped offset quadrature shift keying (SOQPSK-TG) waveform for multi-mode operation,
- a transmitter firmware framework, including shared modules between the telemetry waveforms for optimization of firmware resources;
- a receiver digital front-end, including modules for channelization based on the frequency plan and an optimized digital down conversion scheme, and
- a receiver digital back-end configured for non-coherent demodulation using a discriminator with symbol-timing synchronization.

4. The multi-band multi-mode software-defined radio platform according to claim 1, wherein:
- the configuration and control (C2) subsystem is integrated with the MMDR using a digital radio plane and a C2 plane framework,
- the digital radio plane consisting of the hardware and software components for high-speed signal processing of the telemetry waveforms, including,
  - High-Speed Interface Firmware including serializer and deserializer functionalities for the low voltage digital signaling (LVDS) interface
  - Waveform firmware including functionalities for modulation, demodulation, and synchronization of the telemetry waveform; and
  - Digital Radio general purpose processor (GPP) including functionalities for data interfaces via Zynq Gigabit Ethernet controller (GIGE);
- the C2 plane consisting of the hardware and software components for system booting, configuration and control of the MBFE and MMDR, memory, filesystem (FS) management, and system status monitoring, including,
  - Configuration and Control GPP consisting of general configuration and control software (C2 CORE SW) for booting, configuration, control, and status;
  - initial boot software, including Linux kernel, Linux ramdisk loading, and golden firmware;
  - Control/Status interface to MBFE CTRL using an I2C protocol;
  - filesystem configured to host configuration bit files for each mode of operation,
wherein configuration is performed using applications and firmware files mounted on the secure digital (SD) card and wherein each operational mode of the multi-band multi-mode software defined radio (MBMM SDR) platform corresponds to a loadable bit file via C2 CORE SW,
and wherein the C2 CORE SW handles initialization and coordination utilizing the following components:
- an independent microcontroller (MBFE CTRL) that controls MBFE subsystem;
- a programmable logic (PL) Memory Map, including Configuration (Config), Control (Ctrl), and Status Registers for a PL side of the Digital Radio (DR) Plane; and
- a processing system (PS) Memory Map including Config, Ctrl, and Status Registers for a PS side of the Digital Radio (DR) Plane.

5. A multi-band front end for a multi-band multi-mode software-defined radio platform comprising:
- an operational RF bandwidth of 100 MHz, including an L-Band at 1435 MHz to 1535 MHZ, an S-Band at 2200 MHz to 2395 MHz, and a C-Band at 4200 MHz to 5250 MHz;
wherein
- the multi-band front end provides 1-MHz frequency resolution for channel selection within operational RF bandwidth;
- band selection is performed using an adaptive filter bank structure, in which the S-Band and C-Band can implement adaptive filters for increased selectivity of the receiver chain;
- the multi-band front end further comprising a MBFE Controller (MBFE CTRL) for configuring the control voltage for the adaptive filters, filter bank switches, frequency synthesizers, variable gain amplifier (VGA), and an automatic gain control (AGC) amplifier.

6. A multi-mode digital radio (MMDR) for use in a multi-band multi-mode software-defined radio platform, comprising:
- a transmitter modulator with integrated pulse code modulation/frequency modulation (PCM/FM) & shaped offset quadrature shift keying (SOQPSK-TG) waveform for multi-mode operation,
- a transmitter firmware framework, including shared modules between the telemetry waveforms for optimization of firmware resources;
- a receiver digital front-end, including modules for channelization based on the frequency plan and an optimized digital down conversion scheme, and
- a receiver digital back-end configured for non-coherent demodulation using a discriminator with symbol-timing synchronization.

7. An integrated multi-mode digital radio (MMDR) and configuration and control subsystem for a multi-band multi-mode software-defined radio platform, comprising:
- a digital radio plane and a configuration and control (C2) plane,
- the digital radio plane consisting of the hardware and software components for high-speed signal processing of the telemetry waveforms, including, High-Speed Interface Firmware including serializer and deserializer functionalities for the low voltage digital signaling (LVDS) interface Waveform firmware including functionalities for modulation, demodulation, and synchronization of the telemetry waveform; and Digital Radio general purpose processor (GPP) including functionalities for data interfaces via Zynq Gigabit Ethernet controller (GIGE);

the C2 plane consisting of the hardware and software components for system booting, configuration and control of the multi-band front-end (MBFE) and MMDR, memory, filesystem (FS) management, and system status monitoring, including, Configuration and Control GPP consisting of general configuration and control software (C2 CORE SW) for booting, configuration, control, and status;

initial boot software, including Linux kernel, Linux ramdisk loading, and golden firmware;

Control/Status interface to MBFE control (CTRL) using an I2C protocol;

filesystem configured to host configuration bit files for each mode of operation, wherein configuration is performed using applications and firmware files mounted on the secure digital (SD) card and wherein each operational mode of the MBMM SDR platform corresponds to a loadable bit file via C2 CORE SW, and wherein the C2 CORE SW handles initialization and coordination utilizing the following components:

an independent microcontroller (MBFE CTRL) that controls MBFE subsystem;

a programmable logic (PL) Memory Map, including Configuration (Config), Control (Ctrl), and Status Registers for a PL side of the Digital Radio (DR) Plane; and a processing system (PS) Memory Map including Config, Ctrl, and Status Registers for a PS side of the Digital Radio (DR) Plane.

* * * * *